US008675554B2

(12) United States Patent
Baglin et al.

(10) Patent No.: US 8,675,554 B2
(45) Date of Patent: Mar. 18, 2014

(54) WIRELESS COMMUNICATION DEVICE AND METHOD FOR PERFORMING NEIGHBOR CELL ANALYSIS DURING CONTINUOUS PACKET CONNECTIVITY MODE

(75) Inventors: Matthieu Richard Joachim Baglin, Toulouse (FR); Marek J. Gil, Norridge, IL (US)

(73) Assignee: Intel Corporation, Santa Clara, CA (US)

( * ) Notice: Subject to any disclaimer, the term of this patent is extended or adjusted under 35 U.S.C. 154(b) by 469 days.

(21) Appl. No.: 12/941,786

(22) Filed: Nov. 8, 2010

(65) Prior Publication Data

US 2012/0113825 A1    May 10, 2012

(51) Int. Cl.
*H04W 80/04*    (2009.01)
*H04W 88/06*    (2009.01)

(52) U.S. Cl.
USPC ............................. 370/328; 455/436; 455/458

(58) Field of Classification Search
USPC ............... 370/229–340; 455/438, 458, 456.1
See application file for complete search history.

(56) References Cited

U.S. PATENT DOCUMENTS

| 7,515,559 | B2 * | 4/2009 | Koo et al. ...................... 370/328 |
| 7,620,120 | B2 * | 11/2009 | Auranen ......................... 375/316 |
| 7,633,927 | B2 * | 12/2009 | Ruohonen et al. ............ 370/350 |
| 7,684,372 | B2 * | 3/2010 | Beale et al. ..................... 370/334 |
| 7,924,754 | B2 * | 4/2011 | Bergman et al. .............. 370/310 |
| 8,023,455 | B2 * | 9/2011 | Anderson ...................... 455/450 |
| 8,098,635 | B2 * | 1/2012 | Montojo et al. ............... 370/335 |
| 8,160,075 | B2 * | 4/2012 | Kazmi et al. .............. 370/395.42 |
| 8,213,957 | B2 * | 7/2012 | Bull et al. ................... 455/456.1 |
| 8,284,728 | B2 * | 10/2012 | Andersson .................... 370/329 |
| 2004/0166858 | A1 * | 8/2004 | Masuda et al. ................ 455/436 |
| 2005/0213575 | A1 * | 9/2005 | Shin et al. ...................... 370/389 |
| 2008/0102880 | A1 * | 5/2008 | Gholmieh et al. ............. 455/522 |
| 2008/0207247 | A1 * | 8/2008 | Gholmieh et al. ............. 455/522 |
| 2009/0131073 | A1 * | 5/2009 | Carlson et al. ............. 455/456.1 |
| 2009/0203376 | A1 |  8/2009 | Sambhwani et al. |
| 2009/0203409 | A1 * | 8/2009 | Castor et al. .................. 455/574 |
| 2009/0264130 | A1 * | 10/2009 | Catovic et al. ................ 455/436 |

(Continued)

OTHER PUBLICATIONS

3rd Generation Partnership Project, "3GPP TS 25.214 V7.16.0; 3rd Generation Partnership Project; Technical Specification Group Radio Access Network; Physical layer procedures (FDD); (Release 7)", Sep. 2010, pp. 1-88.

(Continued)

*Primary Examiner* — Jeffrey M Rutkowski
*Assistant Examiner* — John Lequang
(74) *Attorney, Agent, or Firm* — Schwabe, Williamson & Wyatt, P.C.

(57) ABSTRACT

A wireless communication device is operable to perform neighbor cell analysis functions while operating in a continuous packet connectivity (CPC) mode and without requiring dedicated time periods for performing the neighbor cell analysis functions as part of a discontinuous reception (DRX) phase of the CPC mode. The DRX phase includes discontinuous (e.g., periodic) time periods for monitoring a downlink control channel from a serving base station. A receiver of the wireless communication device receives a control signal over the downlink control channel during each time period of the discontinuous time periods. A processor of the wireless communication device performs a portion of a neighbor cell analysis function during each time period of a quantity of the discontinuous time periods to produce neighbor cell analysis data. The processor accumulates the neighbor cell analysis data over the quantity of time periods to complete the neighbor cell analysis function.

33 Claims, 11 Drawing Sheets

(56) References Cited

U.S. PATENT DOCUMENTS

| | | | |
|---|---|---|---|
| 2009/0296643 A1* | 12/2009 | Cave et al. | 370/329 |
| 2010/0087149 A1* | 4/2010 | Srinivasan et al. | 455/63.1 |
| 2010/0157953 A1* | 6/2010 | Christoffersson et al. | 370/336 |
| 2010/0157956 A1* | 6/2010 | Takahashi | 370/336 |
| 2010/0202307 A1* | 8/2010 | Lee et al. | 370/252 |
| 2010/0216455 A1* | 8/2010 | Kazmi | 455/424 |
| 2010/0323633 A1* | 12/2010 | Pani et al. | 455/67.14 |
| 2010/0330992 A1* | 12/2010 | Bhattacharjee et al. | 455/436 |
| 2011/0170482 A1* | 7/2011 | Dhanda | 370/328 |
| 2012/0008510 A1* | 1/2012 | Cai et al. | 370/252 |
| 2012/0033595 A1* | 2/2012 | Aoyama et al. | 370/311 |
| 2012/0082054 A1* | 4/2012 | Gholmieh et al. | 370/252 |
| 2012/0113825 A1* | 5/2012 | Baglin et al. | 370/252 |
| 2012/0250538 A1* | 10/2012 | Su et al. | 370/252 |

OTHER PUBLICATIONS

3rd Generation Partnership Project, "3GPP TS 25.331 V7.18.0; 3rd Generation Partnership Project; Technical Specification Group Radio Access Network; Radio Resource Control (RRC); Protocol Specification (Release 7)", Sep. 2010, pp. 1-31. 307-308, 699-700.

* cited by examiner

WIRELESS COMMUNICATION DEVICE AND METHOD FOR PERFORMING NEIGHBOR CELL ANALYSIS DURING CONTINUOUS PACKET CONNECTIVITY MODE

FIELD OF THE INVENTION

The present invention relates generally to wireless communication networks and, more particularly, to a wireless communication device and method for operating same to perform neighbor cell analysis functions as part of a discontinuous reception (DRX) phase of a continuous packet connectivity (CPC) mode without requiring dedicated time periods for performing such neighbor cell analysis functions.

BACKGROUND

Wireless communication networks are well known. Some networks are completely proprietary, while others are subject to one or more standards to allow various vendors to manufacture equipment for a common system. Standards-based networks include networks, such as the Universal Mobile Telecommunications System (UMTS), the Global System for Mobile Communications (GSM) and its progeny (e.g., the General Packet Radio Service (GPRS) and the Enhanced Data rates for GSM Evolution (EDGE)), and the Long Term Evolution (LTE) system developed by the Third Generation Partnership Project (3GPP), a collaboration between groups of telecommunications associations to make globally applicable third generation (3G) mobile phone system specifications within the scope of the International Mobile Telecommunications-2000 project of the International Telecommunication Union (ITU).

The 3GPP has adopted Wideband Code Division Multiple Access (WCDMA) as the wireless air interface access for the UMTS network. WCDMA provides high frequency spectrum utilization, universal coverage, and high quality, high-speed multimedia data transmission. When operating over a 3G mobile telecommunications system, such as UMTS, a user can utilize a wireless communications device, such as a mobile phone, to engage in real-time video communications and conference calls, play real-time games, receive online music broadcasts, and send/receive email. However, because these functions rely on fast, instantaneous transmission, 3G systems utilize technologies, such as High Speed Packet Access (HSPA), which includes High Speed Downlink Packet Access (HSDPA) and High Speed Uplink Packet Access (HSUPA), to improve uplink/downlink transmission rate.

In order to improve HSDPA and HSUPA, Release 7 (R7) of the 3GPP standard provides a Continuous Packet Connectivity (CPC) protocol specification, which includes features that aim to significantly increase the number of packet data users per cell, reduce the uplink noise level resulting from such increase in packet data users, reduce power consumption at the user equipment (UE) (e.g., mobile device), and improve the achievable download capacity for various data services, such as Voice over Internet Protocol (VoIP).

According to the CPC protocol specification, discontinuous transmission (DTX) and discontinuous reception (DRX) operation is used by the UE, such as a smart phone, when transmissions between the UE and the serving base station (e.g., enhanced Node B or eNodeB) are decreasing. The DTX-DRX operation includes discontinuous uplink transmission (uplink DTX) and discontinuous downlink reception (downlink DRX). Uplink DTX is a mechanism where control signals are transmitted on the uplink control channels (e.g., the Uplink Dedicated Physical Control Channel (UL-DPCCH)) according to defined discontinuous patterns during the inactive state of corresponding uplink data channels, such as an Enhanced Dedicated Transport Channel (E-DCH) or a High Speed Physical Control Channel (HS-DPCCH), in order to maintain signal synchronization and power control loop with less control signaling. For example, uplink DTX allows the UE to align UL-DPCCH transmission with a fixed DTX pattern to maintain UE synchronization with the network. Downlink DRX is configured by a Radio Network Controller (RNC), which may form part of the serving base station, and allows the UE to restrict the downlink reception times in order to reduce power consumption. When the downlink DRX is enabled, the UE is not required to receive physical downlink channels except during pre-established time intervals.

According to prior art downlink DRX approaches in the context of CPC during HSPA data transfer, the UE receiver is activated periodically (e.g. every DRX period, which can vary from 8 to 40 milliseconds (ms)) to perform certain tasks. For example, during each active period, the UE may receive a downlink control channel, such as the High Speed Shared Control Channel (HS-SCCH), and process the received control signals to determine whether the serving base station has data to send to the UE. If the UE determines that the serving station has user data to send, the UE keeps its receiver activated so as to be able to receive the data from the serving station. After the data has been received, the UE may keep the receiver activated for an additional period of time according to an inactivity timer in case additional control information or user data is sent.

In addition to being periodically activated or awakened to monitor for data transmission notifications, the UE receiver is also typically activated during dedicated time periods to perform intra-frequency neighbor cell analysis functions so as to determine whether to select a new cell for communication. Depending on network configuration, neighbor cell analysis functions may include, among other things, detecting the presence of neighbor cells belonging to a monitored set and monitoring channel qualities of neighbor cells. The neighbor cell detection function typically occurs in multiple stages and includes receiving primary synchronization channels (stage 1), receiving secondary synchronization channels (stage 2), determining scrambling codes (stage 3), and decoding system frame numbers (SFN) (stage 4). According to 3GPP R7 Technical Specification (TS) 25.133, section 8.1.2.2.2, when DRX is active and the DRX cycle is less than ten subframes (e.g., less than 20 ms where each subframe has a 2 ms duration), the UE must identify and decode the SFN of a new cell in the monitored list within 800 ms. Alternatively, where the DRX cycle is greater than ten subframes, the UE must identify and decode the SFN of a new cell in the monitored list within 1.5 seconds.

In the context of 3GPP TS 25.133, section 8.1.2.2.2, the subframes referred to therein are generally used for monitoring the HS-SCCH of the serving cell in order to detect whether the serving base station has data to send to the UE as part of a continuing data session. Other channels, such as the Fractional Downlink Dedicated Physical Channel (F-DPCH), may also be monitored for power control purposes. To facilitate intra-frequency neighbor cell analysis, the DRX phase of CPC typically includes additional dedicated time periods which exceed the subframe duration and can extend beyond a DRX cycle (e.g., longer than 40 ms) depending on the quantity of neighbor cells to be detected and analyzed. Exemplary DTX-DRX operation is illustrated by the waveform 100 of FIG. 1. In the exemplary waveform 100, the DRX cycle between activations of the UE receiver for serving cell monitoring is 40 ms (e.g., as noted between signals 102 and 103) and the DTX cycle between activations of the UE transmitter is 320 ms (e.g., as noted between signals 105 and 106). Exemplary dedicated time periods for performing intra-frequency neighbor cell analysis are illustrated by signal waveforms 107-112, each of which is illustrated as lasting about 40 ms. While such additional dedicated time periods enable the UE receiver to perform necessary neighbor cell analysis, they also require the UE receiver to be powered on and activated, thereby utilizing valuable UE battery resources and undesirably shortening the time period between required battery recharging.

To facilitate analysis of neighbor cells other than intra-frequency neighbor cells (e.g., cells which do not operate in the same frequency band as the serving cell or operate using a different wireless protocol, such as inter-frequency neighbor cells or cells utilizing the Global System for Mobile Communications (GSM) protocol), 3GPP R7 TS 25,212 provides for a so-called "compressed mode" of operation that introduces transmission gaps in what would otherwise be allocated transmission subframes. The transmission gaps temporarily halt UE transmissions and their associated downlink power control messaging to enable the UE receiver to monitor inter-frequency or other off-frequency neighbor cells instead of power control or other control signaling from the serving cell. To be compliant with the 3GPP specification, any battery-saving solution relating to CPC should preferably be compatible with compressed mode operation.

Figure 1:
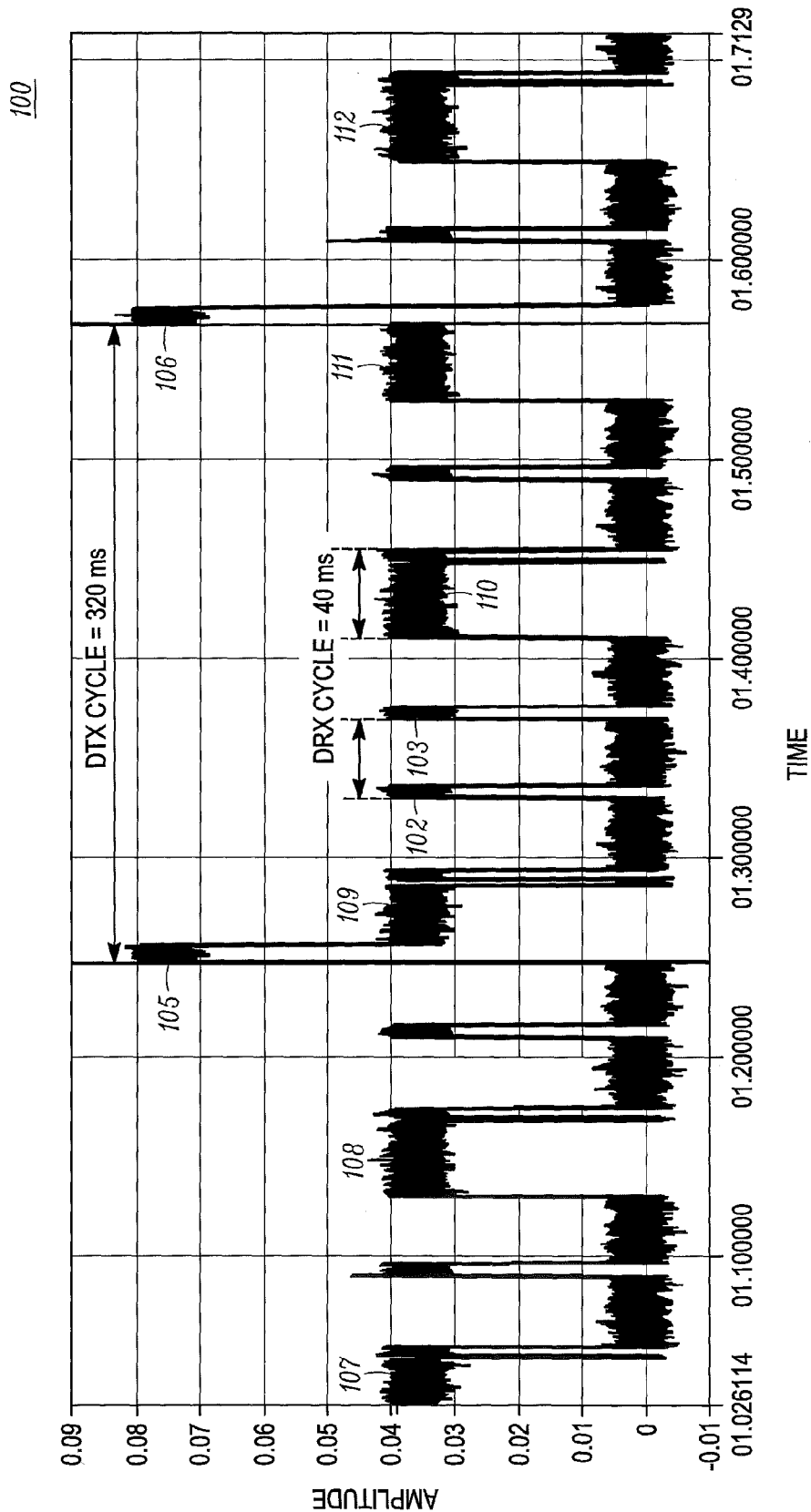
FIG. 1 illustrates an exemplary received signal waveform during CPC mode DTX-DRX operation of a prior art wireless communication device.

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various embodiments of the present invention.

DETAILED DESCRIPTION

Generally, the present invention encompasses a wireless communication device and associated method for performing neighbor cell analysis functions while operating in a continuous packet connectivity (CPC) mode and without requiring dedicated time periods for performing the neighbor cell analysis functions as part of a discontinuous reception (DRX) phase of the CPC mode. The wireless communication device, which preferably includes a receiver, a processor, and optionally a transmitter, may be a computer, a smart phone, a cellular phone, a handheld game system, a wireless data card, or any other electronic device that provides or facilitates mobile wireless communication functionality. The DRX phase includes discontinuous time periods for monitoring a downlink control channel, such as a High Speed Shared Control Channel (HS-SCCH), from a serving base station. A receiver of the wireless communication device receives a control signal over the downlink control channel during each time period of the discontinuous time periods. A processor of the wireless communication device, operating in accordance with a set of stored operating instructions, performs a portion of a neighbor cell analysis function during each time period of a quantity of the discontinuous time periods to produce neighbor cell analysis data. In one embodiment, the portion of the neighbor cell analysis function performed during each time period of the quantity of discontinuous time periods pertains to analysis of intra-frequency neighbor cells (i.e., cells operating at the same center frequency, in the same bandwidth, and with the same wireless, physical layer protocol as the cell currently serving the wireless communication device). The processor accumulates the neighbor cell analysis data over the quantity of time periods to complete the neighbor cell analysis function. In other words, the neighbor cell analysis data is acquired over a quantity of time periods instead of all at once over a dedicated time period, thereby eliminating the need for separate, dedicated neighbor cell monitoring periods (especially intra-frequency neighbor cell monitoring periods).

In an alternative embodiment, the wireless communication device may also include a transmitter operable to transmit control information to the serving base station over an uplink control channel. Additionally, uplink power control information may be transmitted by the serving base station to the wireless communication device over a second downlink control channel. In such an embodiment, the wireless device transmitter transmits control information to the serving base station during a transmission period and the wireless device receiver receives uplink power control information from the serving base station during at least the transmission period to facilitate uplink power control operations of the wireless communication device. For example, where the second downlink control channel and the uplink control channel are divided into respective time slots and the transmission period occupies a set of uplink time slots, the uplink power control information is received by the wireless device receiver during a set of downlink time slots which overlaps the set of uplink time slots in time. Where the wireless communication device is operating in a wireless system implementing the 3GPP standard, the second downlink control channel is a Fractional Dedicated Physical Channel (F-DPCH), and the uplink control channel is an Uplink Dedicated Physical Control Channel (UL-DPCCH), the set of uplink time slots carrying the uplink control information may include a synchronization burst together with a preamble and a postamble. In such a case, the transmission period may form part of a discontinuous transmission (DTX) phase of the CPC mode.

In yet another embodiment, the wireless communication device may be programmed or otherwise configured to monitor and/or analyze cells other than intra-frequency neighbor cells (e.g., inter-frequency neighbor cells or neighbor cells utilizing a different physical layer protocol, such as the Global System for Mobile Communications (GSM) protocol or Long Term Evolution (LTE) protocol) during assigned cell monitoring periods that may wholly or partially overlap the time periods (e.g., slots) during which the wireless device receiver is monitoring the downlink control channel of the serving cell. In accordance with one embodiment, the wireless device receives control signals of neighbor cells other than intra-frequency neighbor cells over respective downlink control channels during the assigned cell monitoring periods to produce received off-frequency neighbor cell control signals. The wireless device processes (e.g., demodulates and decodes) the off-frequency neighbor cell control signals to produce off-frequency neighbor cell control data and performs neighbor cell analysis functions (e.g., neighbor cell identification, downlink signal quality determination, and so forth) based on the off-frequency neighbor cell control data. When a time window assigned to an off-frequency cell monitoring period overlaps a time window assigned to receive or monitor the downlink control channel of the serving cell, the wireless device may reassign the time window assigned to monitor the downlink control channel of the serving cell such that the time window assigned to the off-frequency cell monitoring period does not overlap the time window assigned to monitor the downlink control channel of the serving cell. In one particular embodiment in which the downlink control channel of the serving cell is divided into subframes, the wireless device may reassign the time period for monitoring the downlink control channel of the serving cell to a subframe of the downlink control channel which commences after cessation of the period assigned to receiving or monitoring control signals of the off-frequency neighbor cells.

In another embodiment in which the wireless communication device transmits control information to the serving base station over an uplink control channel and receives uplink power control information from the serving base station over a second downlink control channel, a time window assigned to an off-frequency cell monitoring period may overlap and form part of a so-called "connection frame" with a time window assigned for the wireless device to transmit control information over the uplink control channel. In such a case, the wireless device may transmit control information over the uplink control channel during the connection frame and prior to commencement of the time window assigned to the off-frequency cell monitoring period. The wireless device may then temporarily cease transmission of control information over the uplink control channel during at least part of the time window assigned to the off-frequency cell monitoring period and continue transmission of the control information over the uplink control channel for a remainder of the connection frame after cessation of the off-frequency cell monitoring period. In addition to temporarily ceasing transmission of uplink control information, the wireless device may cease reception of uplink power control information from the serving base station during the time window assigned to the off-frequency cell monitoring period and receive uplink power control information from the serving base station during time periods when control information is being transmitted over the uplink control channel. In this embodiment, when a time window assigned to an off-frequency cell monitoring period also overlaps a time window assigned to a time period for receiving or monitoring the downlink control channel from the serving cell, the wireless device may reassign the time window assigned for monitoring the downlink control channel from the serving cell such that the time window assigned to the off-frequency cell monitoring period does not overlap the time window assigned for monitoring the downlink control channel from the serving cell.

In one embodiment, the assigned cell monitoring periods coincide with transmission gaps introduced during operation of a compressed mode as specified in 3GPP R7 TS 25.212, which may be used in conjunction with CPC mode. When compressed mode is used, the transmission gaps are inserted into what would otherwise be allocated transmission subframes in order to temporarily halt wireless device (e.g., user equipment (UE)) transmissions and their associated downlink power control messaging to enable the wireless device receiver to monitor or otherwise analyze inter-frequency or other off-frequency neighbor cells instead of power control or other control signaling from the serving cell.

In a further embodiment, the neighbor cell analysis functions that may be performed by the wireless communication device include, but are not limited to, measuring channel quality of a downlink control channel supplied by a base station servicing a neighbor cell (e.g., a so-called "intra-frequency cell" neighboring the serving cell serviced by the serving base station and operating in the same frequency band and with the same wireless protocol as the serving cell), decoding a primary synchronization signal communicated by a base station servicing a neighbor cell, decoding a secondary synchronization signal communicated by a base station servicing a neighbor cell, and determining a scrambling code for a neighbor cell. Accordingly, the wireless communication device may at least partially measure neighbor cell channel quality, decode neighbor cell primary synchronization signals, decode neighbor cell secondary synchronization signals, and/or determine neighbor cell scrambling codes during each discontinuous serving cell monitoring period. If a sufficient amount of time is collectively configured for performing neighbor cell analysis, the wireless device may also decode the system frame number (SFN) for each neighbor cell.

In yet another embodiment, the reception and transmission operations of the wireless device may be implemented in a discontinuous manner so as to support DRX operation and discontinuous transmission (DTX) operation according to the 3GPP specification for CPC mode. In this case, the wireless device processor maintains timers for activating the wireless device receiver and transmitter according to the established DTX/DRX phases. In accordance with a DRX phase, the wireless device processor activates the previously deactivated wireless device receiver upon commencement of a serving cell control channel monitoring period and prior to receiving a control signal over the monitored downlink control channel. Additionally, the wireless device processor deactivates the wireless device receiver upon expiration of the serving cell control channel monitoring period in the event that the control signal received during the period does not indicate that the serving base station has user data to send to the wireless communication device. On the other hand, if the control signal received during the serving cell control channel monitoring period indicates that the serving base station has user data to send to the wireless communication device, the wireless device processor maintains activation of the wireless device receiver so as to receive the user data over an appropriate data traffic channel (e.g., a High Speed Downlink Physical Shared Channel (HS-DPSCH)).

By using time periods assigned in the DRX phase of CPC mode for monitoring the serving cell's downlink control channel to also perform portions, of the neighbor cell analysis function, the present invention enables the wireless device to complete the neighbor cell analysis function over time without requiring separate, dedicated neighbor cell analysis time periods. In this manner, the present invention reduces the total amount of time the wireless device's receiver is on during the DRX phase, thereby conserving battery power and extending the time between required battery charges.

Figure 2:
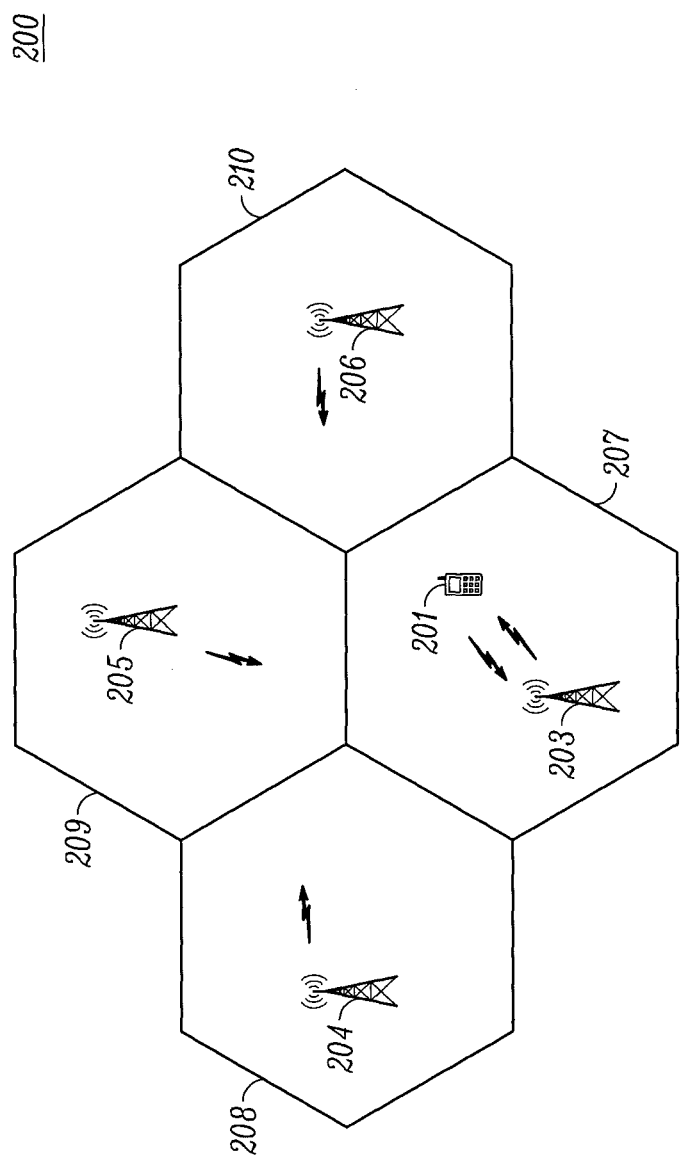
FIG. 2 illustrates a wireless communication system in accordance with an exemplary embodiment of the present invention.

Embodiments of the present invention can be more readily understood with reference to FIGS. 2-10, in which like reference numerals designate like items. FIG. 2 is an electrical block diagram of a wireless communication system 200 in accordance with an exemplary embodiment of the present invention. The wireless system 200 includes one or more wireless communication devices 201 (one shown), a plurality of base stations 203-206 (four shown), and various other conventional infrastructure components (e.g., radio network controllers, home and visitor location registers, a mobile switching center) that facilitate communication within the wireless communication system 200 and between the wireless communication system 200 and other communications systems, such as the public switched telephone network (PSTN) and the Internet. Each base station provides wireless communication service to at least a portion of a respective service coverage area 207-210, which is typically referred to as a "cell." In one embodiment, each cell 207-210 may be subdivided into sectors (e.g., three sectors of 120 degrees each). In such a case, each sector of the cell 207-210 may be serviced by one or more base stations.

Typically, a wireless device 201 located in a particular cell 207 is supplied communication service from one base station 203, which is referred to herein as a "serving base station" or "serving cell." However, in certain systems or under certain circumstances (e.g., soft handoff), a wireless device may be serviced by multiple base stations at the same time. Base stations 204-206 providing communication service to cells 208-210 adjacent the cell 207 in which the wireless device 201 is located are referred to herein as "neighbor or neighboring base stations" or "neighbor cells." During operation of the wireless device 201 in the wireless system 200, the wireless device 201 exchanges control data and traffic or user data with the currently serving base station 203 according to the particular wireless protocol employed in the system 200. In one embodiment, the wireless system 200 employs the High Speed Packet Access (HSPA) protocol operating over a Wideband Code Division Multiple Access (WCDMA) air interface, as specified in Release 7 of the 3GPP specification. In such an embodiment, each base station 203-206 may be referred to as a "Node B," an enhanced Node B, an eNodeB, or an eNB to conform with 3GPP terminology. Alternatively, the wireless system 200 may employ the Evolution Data Only/Evolution Data Optimized (EVDO) protocol operating over a CDMA air interface. Additionally, the wireless device 200 regularly receives control signals from neighboring base stations 204-206 to enable the wireless device 201 to determine, or at least assist in determining, which neighboring base station 204-206 would be best suited to continue supplying communication service to the wireless device 201 in the event that the wireless device 201 moved out of the coverage range of the currently serving base station 203 (i.e., after a handoff).

Figure 3:
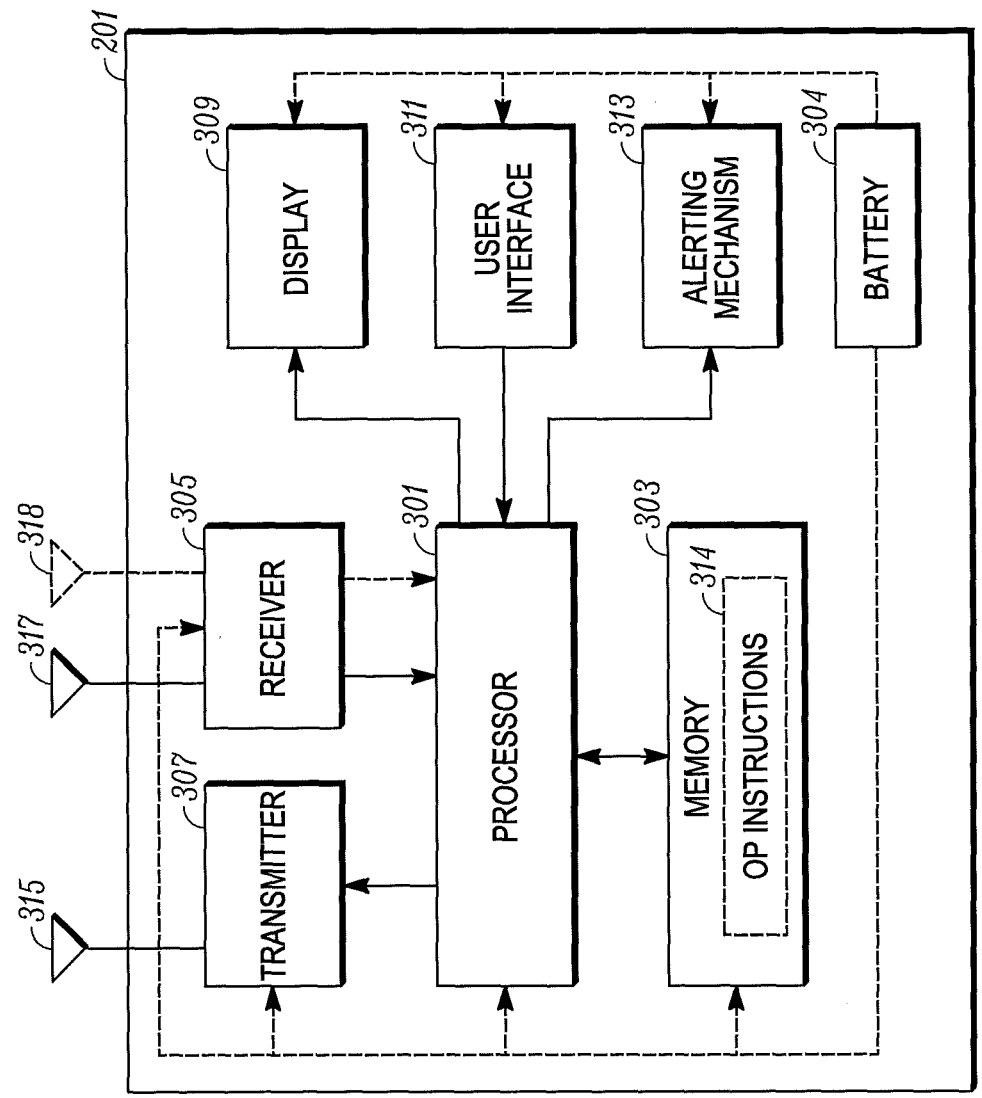
FIG. 3 illustrates an electrical block diagram of an exemplary wireless communication device in accordance with the present invention.

FIG. 3 is an electrical block diagram of an exemplary embodiment of the wireless communication device 201. The exemplary wireless communication device 300 includes, inter alia, a processor 301, at least one storage device (e.g., memory 303), a direct current (DC) power source (e.g., a rechargeable battery 304), a receiver 305, a transmitter 307, a display 309, a user interface 311, an alerting mechanism 313, and one or more antennas 315, 317-318 (three shown). As illustrated, the processor 301 is operably coupled to the memory 303, the receiver 305, the transmitter 307, the display 309, the user interface 311, and the alerting mechanism 313. The battery 304 supplies DC power to all the components of the wireless device 201 which require such power. The wireless device 201 may optionally include various other elements, such as input/output ports (which may be wired or wireless interfaces, such as Universal Serial Bus (USB), MP3, Wi-Fi, and/or Bluetooth interfaces) and an external memory interconnect 315 to interface with a separate, transportable external memory device 317 (e.g., a USB flash drive, a flash memory card, a subscriber identification module (SIM) card, or any other portable storage device). When included, the optional components 307-315 are operably coupled to and controlled directly or indirectly by the processor 301.

The wireless communication device 201 may be any device or user equipment (UE) capable of communicating data over a wireless communication system 200 and operating in a continuous packet connectivity (CPC) mode similar to the CPC mode described in the 3GPP standard. Accordingly, the wireless device 201 may be a smart phone, a cellular phone, a mobile phone, a two-way radio, a wireless messaging device, a computer with an embedded or attached wireless modem or air card (e.g., a netbook computer, an "iPAD" computer, a notebook computer, a laptop computer, or a palmtop computer), a personal digital assistant (PDA), a wireless email device, a handheld or portable gaming device including a an embedded or attached wireless modern, a portable DVD player including a an embedded or attached wireless modem, or any other mobile wireless data-capable device.

The processor 301 may be a microprocessor, a microcontroller, a digital signal processor (DSP), a state machine, logic circuitry, or any other device or combination of devices that processes information based on operating or programming instructions stored in the memory 303. One of ordinary skill in the art will appreciate that the processor 301 can be implemented using multiple processors as may be required to handle the processing requirements of the present invention and the various other included functions of the wireless device 201. One of ordinary skill in the art will further recognize that when the processor 301 has one or more of its functions performed by a state machine or logic circuitry, the memory containing the corresponding operational instructions can be embedded within the state machine or logic circuitry as opposed to being external to the processor 301, as is the wireless device's internal memory 303 illustrated in FIG. 3. In one embodiment, the processor 301 controls substantially all the functionality of the wireless device 201.

The wireless device's internal memory 303 stores, inter alia, the operating instructions 314 used by the processor 301 to control operation of the various components of the wireless device 201, including the operating instructions necessary to perform neighbor cell analysis functions while the wireless device 201 is operating in CPC mode as described in more detail below with respect to FIGS. 4-10. The memory 303 may be separate from the processor 301 as depicted in FIG. 3 or integrated into the processor 301 as noted above. The memory 303 can include random access memory (RAM), read-only memory (ROM), flash memory, electrically erasable programmable read-only memory (EEPROM), and/or various other forms of memory as are well known in the art. It will be appreciated by one of ordinary skill in the art that the various memory components can each be a group of separately located memory areas in the overall or aggregate device memory 303 and that the device memory 303 may include one or more individual memory elements.

The receiver 305 and the transmitter 307 may comprise any conventional hardware and software for communicating control and user data, including voice communications, between the wireless device 201 and base stations 203-206 providing communication service to the wireless device 201. Depending on the wireless protocol(s) chosen for the wireless system(s) 200 in which the wireless device 201 can operate, the receiver 305 and the transmitter 307 may support one or more wireless communication protocols, such as Wi-Fi (e.g., IEEE 802.11 a/b/g/n), WiMax (e.g., IEEE 802.16), Ultra Wide-Band (e.g., IEEE 802.15.4a draft standard), CDMA, wideband CDMA, time division multiple access (TDMA), Global System for Mobile Communications (GSM), Enhanced Data GSM Environment (EDGE), General Packet Radio Service (GPRS), frequency division multiple access (FDMA), orthogonal frequency division multiplexing (OFDM), Long Term Evolution (LTE), spread spectrum, or any other known or future developed access or link protocol or methodology, which supports CPC or a similar mode of operation. The receiver 305 and the transmitter 307 may include multiple receivers and transmitters when multiple link technologies are employed by the wireless device 201. Additionally, where the receiver 305 supports single input, multiple output (SIMO) and/or multiple input, multiple output (MIMO) functionality as supported by HSPA and LTE protocols, the wireless device 201 may include two or more receive antennas 317-318 (two shown for illustration). Alternatively or additionally, multiple receive antennas may be included where the receiver 305 is a multi-mode receiver supporting reception of signals transmitted using different air interfaces (e.g., WCDMA and GSM, or CDMA and WCDMA). Further, whereas the depicted wireless device 201 includes only a single transmit antenna 315, one or more additional transmit antennas may be used where the transmitter 307 supports MIMO functionality and/or the transmitter 307 is a multi-mode transmitter supporting transmission of signals using different air interfaces.

The display 309 may be any conventional or future-developed display, such as a liquid crystal display (LCD), a plasma display, a light emitting diode (LED) display, an organic LED (OLED) display, or any other display technology. The display 309 includes appropriate conventional drivers and may optionally include graphics processors for illuminating various portions (e.g., pixels) of a display screen as instructed by the processor 301. The user interface 307 may be any conventional user interface or combination of conventional user interface components, such as rocker keys, buttons, a keypad, a keyboard, a scroll wheel, a thumbwheel, one or more microphones and associated speech conversion/processing software, one or more speakers, a touchpad, a touchscreen incorporated into a display screen of the display 309, or any other now known or future-developed user interface technology.

The alerting mechanism 313 may include a vibration device, a speaker with appropriate drive circuitry, and/or LEDs or other visual notification means with appropriate drive circuitry, or utilize some or all of the user interface 311 under the control of the processor 301 to alert the wireless device user of the arrival of an incoming message or call. Such an alerting mechanism is generally known in the art.

Figure 4:
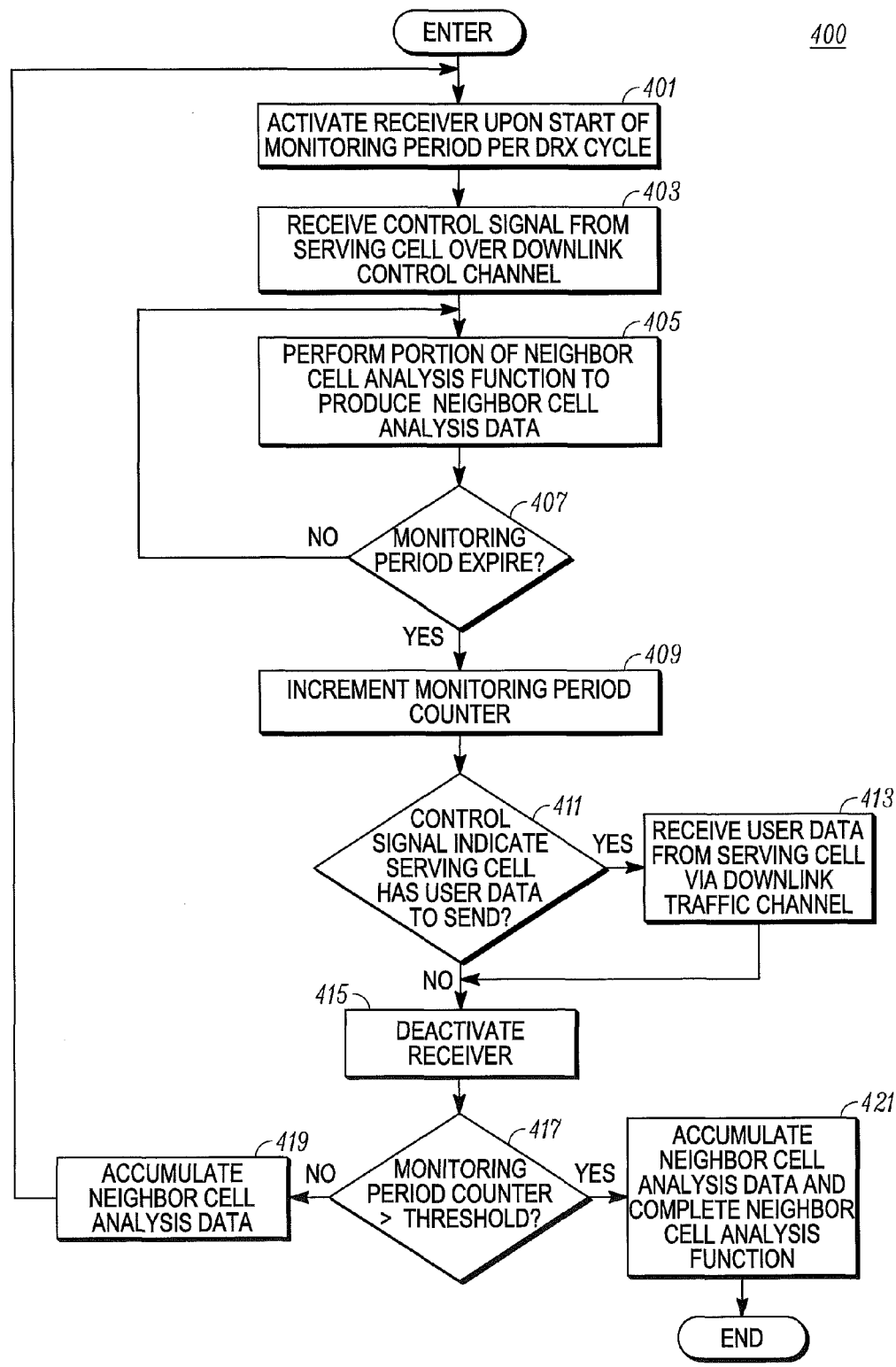
FIG. 4 is a logic flow diagram of steps executed by a wireless communication device to perform neighbor cell analysis while operating in CPC mode in accordance with one exemplary embodiment of the present invention.
Figure 5:
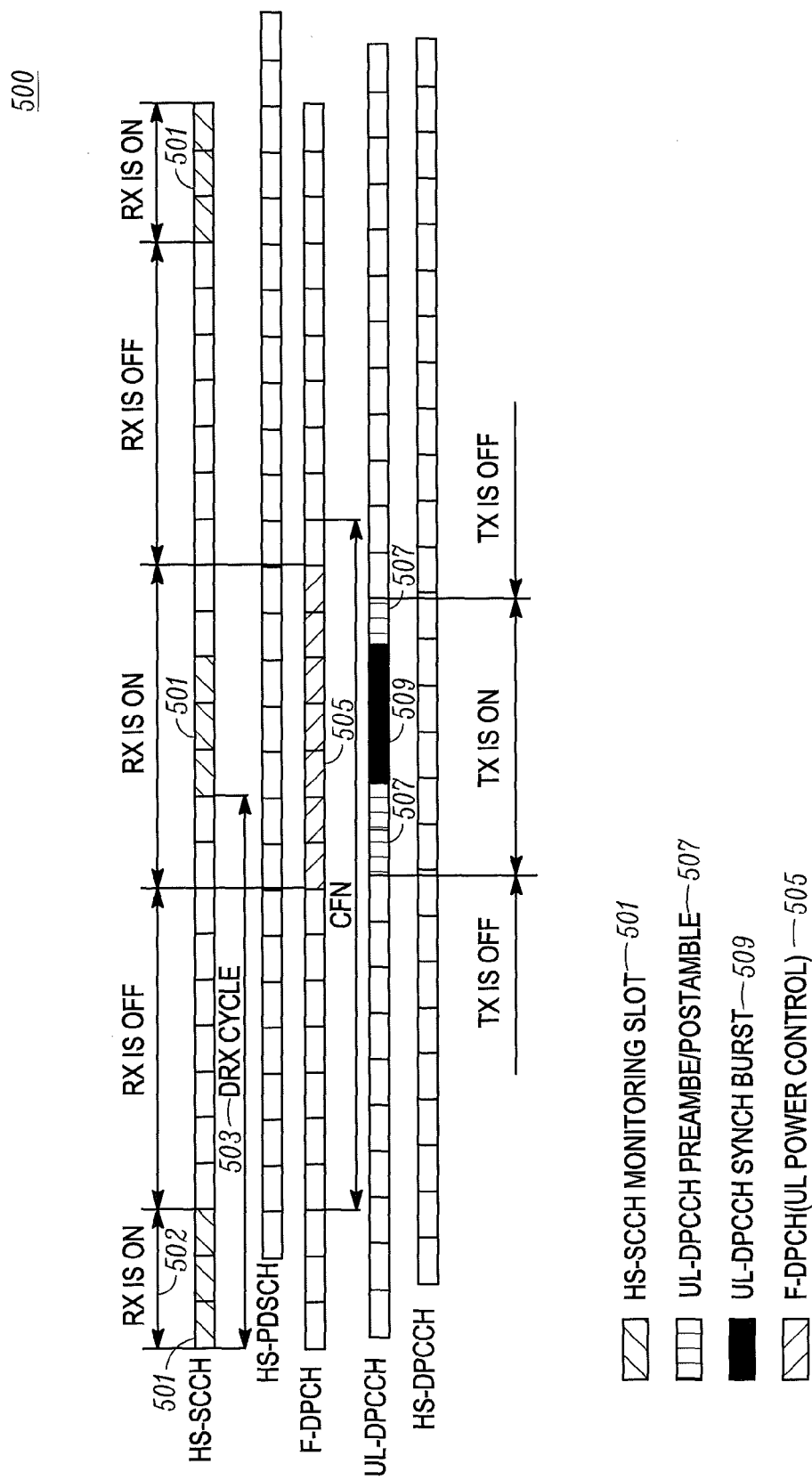
FIG. 5 is a timing diagram illustrating allocations of time slots and subframes of various uplink and downlink control channels during CPC mode, without compressed mode, operation of a wireless communication device in accordance with one exemplary embodiment of the present invention.
Figure 6:
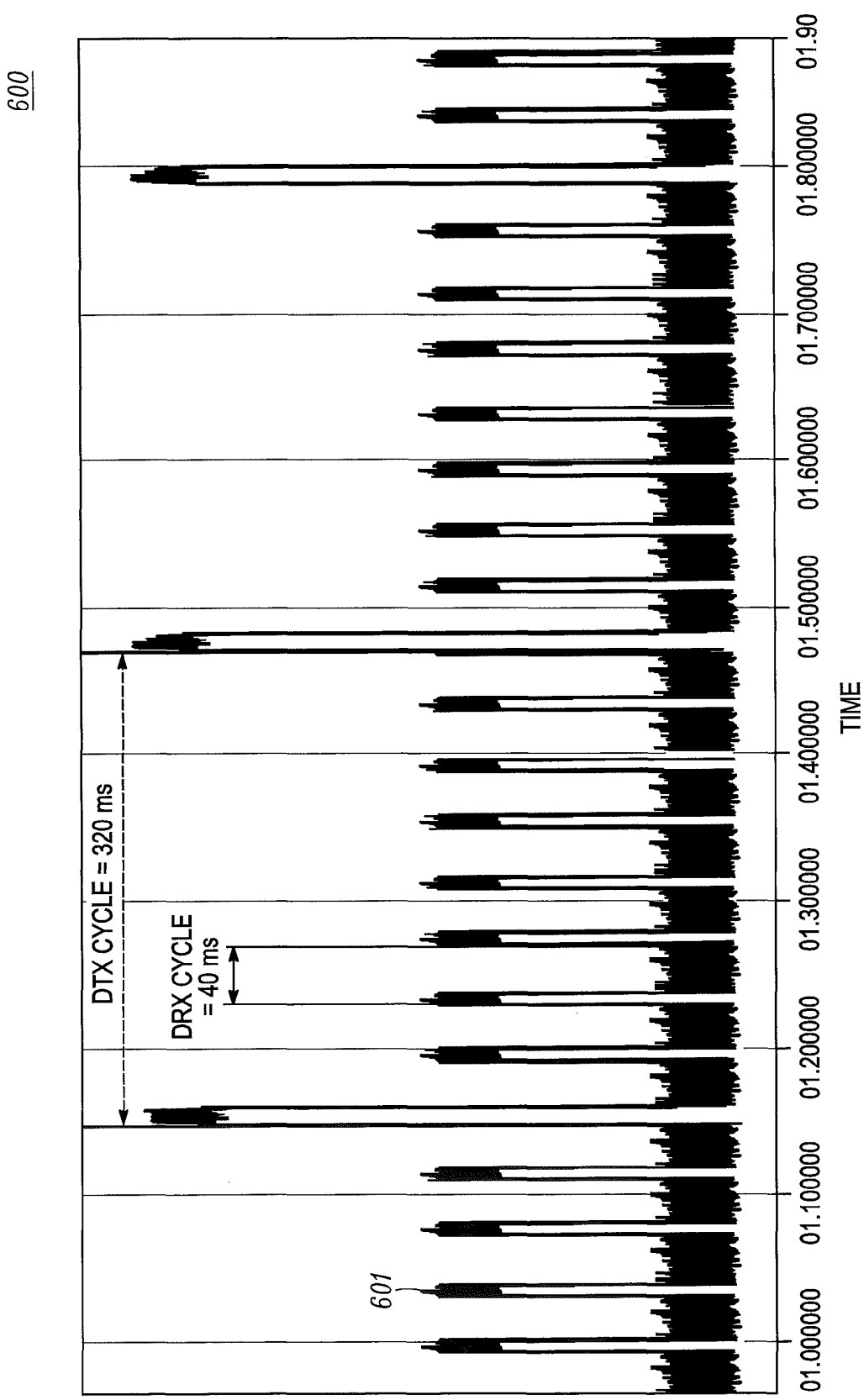
FIG. 6 illustrates a received signal waveform during exemplary CPC mode DTX-DRX operation of a wireless communication device in accordance with one embodiment of the present invention.

Operation of the wireless device 201 in accordance with the present invention to perform neighbor cell analysis functions while operating in a CPC mode without requiring dedicated time periods for performing the neighbor cell analysis functions as part of the DRX phase of the CPC mode may be best understood with reference to FIGS. 4-10. FIGS. 4-6 illustrate operation of the wireless device 201 in accordance with embodiments of the present invention during periods when compressed mode under 3GPP R7 TS 25.212 is not in use; whereas, FIGS. 7-10 illustrate operation of the wireless device 201 in accordance with embodiments of the present invention during periods when compressed mode is in use.

Referring first to FIG. 4, a logic flow diagram 400 is depicted illustrating steps executed by a wireless communication device 201 to perform neighbor cell analysis while operating in CPC mode in accordance with one exemplary embodiment of the present invention. The logic flow steps may be executed by the wireless device processor 301 and receiver 305. Execution of logic flow steps by the wireless device processor 301 is preferably in accordance with the operating instructions 314 stored in device memory 303.

According to the logic flow of FIG. 4, the wireless device processor 301 activates (401) a previously de-activated wireless device receiver 305 upon commencement of a serving cell monitoring period according to a DRX phase of the CPC mode. As is generally known in the art, the DRX phase of the CPC mode includes multiple discontinuous time periods for the wireless device 201 to monitor a downlink control channel from the serving cell base station 203 (e.g., the HS-SCCH where the wireless system 200 utilizes HSPA) to determine whether the serving base station 203 has user data to send to the wireless device 201. When compressed mode is not in use, the serving cell monitoring periods occur periodically and generally have a duration of at least two milliseconds. When compressed mode is in use, the serving cell monitoring periods may or may not occur periodically depending upon the positioning of the compressed mode gaps, as will be described in more detail below with respect to FIGS. 7-10. The actual duration of each serving cell monitoring period is established by the service provider of the wireless system 200 and is communicated to the wireless device 201 via control messaging from the serving base station 203. For example, in one embodiment, each serving cell monitoring period commences every eight milliseconds and is two milliseconds in duration for a total DRX cycle of eight milliseconds. Where the wireless system 200 utilizes HSPA over a WCDMA air interface, each serving cell monitoring period may occupy three time slots or one subframe on the HS-SCCH and occur once every four subframe DRX cycle for the duration of the DRX phase. Alternatively, the wireless service provider (carrier) may establish a longer duration serving cell monitoring period with a different periodicity taking into account the particular characteristics of the wireless system 200. In contrast to a conventional DRX phase of CPC mode operation, the present invention makes further use of serving cell monitoring periods to perform neighbor cell monitoring (especially intra-frequency neighbor cell monitoring) so as to eliminate, or mitigate the time duration of, dedicated neighbor cell monitoring periods during the DRX phase. The elimination or mitigation of such dedicated neighbor cell monitoring periods serves to reduce the amount of time that the wireless device receiver 305 must remain on and thereby extends the life (or time between charges) of the wireless device battery 304.

FIG. 5 shows a timing diagram 500 illustrating allocations of time slots and subframes of various uplink and downlink control channels during CPC mode, without compressed mode, operation of a wireless communication device 201 in accordance with the above-described exemplary embodiment of the present invention. The timing diagram 500 of FIG. 5 will be referenced throughout the description of FIG. 4 to provide an exemplary, but not exclusive, context for understanding operation of the present invention during times when compressed mode operation does not impact CPC mode operation. The timing diagram 500 of FIG. 5 is for a wireless system 200 that utilizes HSPA over a WCDMA air interface. Thus, the depicted downlink control channels are the HS-SCCH, over which user data transmission is scheduled by the serving base station 203, and a Fractional Dedicated Physical Channel (F-DPCH), over which power control information is provided to the wireless device 201 by the serving base station 203. The downlink traffic channel is the High Speed Physical Downlink Shared Channel (HS-PDSCH), over which user data is transmitted from the serving base station 203 to the wireless device 201. The uplink control channels are the Uplink Dedicated Physical Control Channel (UL-DPCCH), over which synchronization signals are transmitted during allocated time periods of a discontinuous transmission (DTX) phase of the CPC mode, and the High Speed Dedicated Physical Control Channel (HS-DPCCH), over which other control information, such as channel quality indicators (CQIs) and hybrid automatic repeat request (HARQ) acknowledgements (ACKs) and negative acknowledgements (NACKs) are communicated to the serving base station 203.

In the embodiment shown in FIG. 5, each uplink and downlink channel is divided into time slots, with a set of three time slots corresponding to a subframe. Thus, each serving cell monitoring period 502 occupies a set of three time slots 501 which occur periodically once every DRX cycle 503 (e.g., every four subframes 502). Upon commencement of the serving cell monitoring period 502, the wireless device processor 301 activates (401) the wireless device receiver 305 (i.e., turns the receiver 305 on) to enable reception of the HS-SCCH by the wireless device 203.

After the receiver 304 has been turned on at the beginning of a serving cell monitoring period, the receiver 305 receives (403) one or more control signals from the serving base station 203 over a downlink control channel. In the embodiment illustrated in FIG. 5, the wireless device receiver 305 is turned on for a sufficient amount of time so as to receive a subframe 502 of time slots 501 over the HS-SCCH. Additionally, the wireless device receiver may also be turned on to receive power control time slots 505 over the F-DPCH.

In one embodiment, the wireless device processor 301 instructs the receiver 305 to receive the first time slot 501 in the HS-SCCH subframe 502. The wireless device processor 301 then processes the slot control data to determine whether the serving base station 203 has user data to send to they wireless device 201. Additionally, in parallel to the processing of the slot control data, the processor 301 proceeds to perform (405) a portion of a neighbor cell analysis function and instructs the receiver 305 to detect control signals from one or more neighboring base stations 204-206 (e.g., intra-frequency neighboring base stations). The neighbor cell analysis function may include processing of received neighbor cell signals to correctly identify the neighbor cell stations 204-206 and acquire information useful to the wireless device 201 and the wireless system infrastructure in determining whether a handoff may be necessary. For example, the neighbor cell analysis function may include decoding primary and secondary synchronization signals for the neighbor base stations 204-206, determining scrambling codes for the neighbor base stations 204-206, measuring or otherwise determining channel quality for downlink control channels of the neighbor base stations 204-206, determining system frame numbers for the neighbor base stations 204-206, and averaging (layer 3 filtering) the different neighbor cell measurements so as to report them to the serving base station 203. Thus, depending on the slot duration, the quantity of neighboring cells, and the type of neighbor cell analysis to be performed, the processor 301 may at least partially decode a primary and/or a secondary synchronization signal for one or more of the neighbor base stations 204-206, at least partially determine a scrambling code for one or more of the neighbor base stations 204-206, and/or at least partially measure or determine channel quality for downlink control channels of one or more of the neighbor base stations 204-206.

After the wireless device processor 301 begins performing the neighbor cell analysis function, the processor 301 determines (407) whether the serving cell monitoring period has expired (e.g., whether the subframe 502 has ended). If the serving cell monitoring period has not expired, the processor 301 continues performing parts of the neighbor cell analysis function. On the other hand, if the serving cell monitoring period has expired, the processor 301 increments (409) a serving cell monitoring period counter. For example, in one embodiment, the processor 301 may be programmed to perform neighbor cell analysis over a predetermined quantity of subframes 502 during the DRX phase of CPC mode such that neighbor cell analysis data is sent to the serving base station 203 regularly or based on certain events, such as upon meeting a predetermined path loss and/or received signal code power (RSCP) level for a measured neighbor cell, as may be configured in the processor software or required from the serving base station 203 depending on system configuration. The quantity of subframes 502 or other discontinuous serving cell monitoring periods used to complete the neighbor cell analysis function and the reporting period of the neighbor cell analysis data may be set by the wireless service provider based on the particular configuration of the wireless system 200.

If, as part of its analysis of the control signal received during the serving cell monitoring period, the wireless device processor 301 determines (411) that the serving base station 203 has user data to send to the wireless device 201, the processor 301 maintains activation of the receiver 305 so as to begin receiving the user data over an assigned traffic channel (e.g., slots of the HS-PDSCH). At the appropriate time, the activated receiver 305 receives (413) the user data from the serving base station 203 via a downlink traffic channel, such as the HS-PDSCH. After the user data has been received, the wireless device processor 301 deactivates (415) the receiver 305, unless the receiver 305 must remain activated to accommodate a serving cell monitoring period or an inactivity threshold according to the DRX phase of the CPC mode or to accommodate a synchronization transmission according to a discontinuous transmission (DTX) phase of the CPC mode. As will be explained in more detail below, synch transmissions over a WCDMA uplink during the DTX phase require the receiver 305 to be activated in order to receive transmit power control messaging associated with the DTX synch transmission over a downlink control channel, such the F-DPCH. If the wireless device processor 301 determines (411) that the serving base station 203 does not have user data to send to the wireless device 201, the wireless device processor 301 deactivates (415) the receiver 305, unless the receiver 305 must remain activated to accommodate a synchronization transmission according to a DTX phase of the CPC mode.

After completing each serving cell monitoring period, the wireless device processor 301 may determine (417) whether the serving cell monitoring period counter, when used, meets or exceeds a threshold. As discussed above, the threshold may be set as the quantity of serving cell monitoring periods which will, or are most likely to, result in completing the neighbor cell analysis function when the completion of such function is distributed or stretched out over multiple serving cell monitoring periods. The threshold may be set by the wireless service provider to take into account the configuration of the wireless system 200 and may be supplied to the wireless device at the time of provisioning or at a later time via control signaling from the serving base station 203.

If the monitoring period counter, when used, does not meet or exceed the threshold, the wireless device processor 301 accumulates (419) the neighbor cell analysis data measured or determined to that point and awaits the start of the next serving cell monitoring period (e.g., subframe 502) or other time period requiring activation of the receiver 305 in accordance with the DTX and DRX phases of the CPC mode. On the other hand, if the monitoring period counter, when used, does not meet or exceed the threshold, the wireless device processor 301 accumulates (421) the neighbor cell analysis data measured or determined to that point and completes (421) the neighbor cell analysis function. In other words, the wireless device processor 301 finishes determining the neighbor cell analysis data the processor 301 will be sharing with the serving base station 203 during the next reporting period. For example, the processor 301 may use the first series of serving cell monitoring periods (e.g., between two to twenty discontinuous/periodic subframes 502) to determine the scrambling codes and decode the primary and secondary synchronization signals of monitored intra-frequency neighbor cell base stations 204-206 in a WCDMA system running HSPA. The neighbor cells 204-206 selected for monitoring may be chosen in accordance with conventional handoff candidate selection techniques. The processor 301 may then use the remaining serving cell monitoring periods in the threshold set to determine the channel quality or CQIs for the monitored neighbor cells 204-206. In an alternative embodiment where the system configuration permits longer time periods between reporting neighbor cell analysis data, the wireless device processor 301 may also determine the system frame numbers (SFNs) for the monitored neighbor cells 204-206. In such a case, the SFNs may also be reported to the serving base station 203 as required by the network configuration.

As noted above and illustrated in FIG. 5, CPC mode typically includes a DRX phase including multiple DRX cycles and a DTX phase including multiple DTX cycles. In accordance with the present invention, each DRX cycle includes a serving cell monitoring period, unless preempted by a compressed mode (CM) gap as detailed below with respect to FIGS. 7-10. Each DTX cycle includes a control information transmission period that overlaps a serving cell monitoring period of the DRX phase, unless preempted or otherwise affected by a CM gap. To accommodate the DTX transmission, power control information is sent from the serving base station 203 to the wireless device 201 to enable the wireless device 201 to set the correct transmit power control parameters for the uplink control information transmission. For example, as illustrated in FIG. 5, the transmit power control information may be transmitted from the serving base station 203 to the wireless device 201 in a set of time slots 505 of the F-DPCH. The transmit power control information is used to control the uplink transmission of control information in time slots 507, 509 of the uplink control channel in accordance with the DTX phase parameters. The uplink control information may include a synchronization (synch) burst (slots 509) predicated by a preamble and followed by a postamble (slots 507) in accordance with known techniques. Because there is inherently an offset between the time slots of the downlink channels (e.g., HS-SCCH, HS-PDSCH, and F-DPCH) and the time slots of the uplink channels (e.g., UL-DPCCH and HS-DPCCH), the transmit power control information is transmitted over the F-DPCH in downlink slots 505 which overlap the uplink slots 507, 509 of the UL-DPCCH to be used for transmitting the uplink control information so that proper power control can be maintained during the uplink transmission. Pursuant to the 3GPP specification, a DTX transmission period and associated transmit power control signaling occur during a connection frame, which is identified by a connection frame number (CFN). The quantity of F-DPCH slots 505 used to convey the transmit power control information and the positioning of such clots 505 within the connection frame depends upon whether positioning of a CM gap requires the transmission period to be split up, as discussed in more detail below with respect to FIG. 10.

Thus, FIG. 5 illustrates how the wireless device processor 301 may, in an exemplary manner, activate and deactivate the wireless device receiver 305 and transmitter 307 to facilitate DTX-DRX operation of the wireless device 201 during CPC mode without the influence of compressed mode operation, in accordance with the present invention. As can be observed from the serving cell monitoring periods (subframes 502) occurring over the HS-SCCH, the wireless device receiver 305 is not separately activated to perform intra-frequency neighbor cell analysis at any dedicated times. Instead, such intra-frequency neighbor cell analysis is performed during the serving cell monitoring periods. The absence of separate, dedicated neighbor cell monitoring can also be seen in FIG. 6, which illustrates a received signal waveform during exemplary CPC mode DTX-DRX operation of a wireless communication device 201 in accordance with another embodiment of the present invention. The embodiment depicted in FIG. 6 corresponds to use of HSPA over a WCDMA air interface as in the embodiment of FIG. 5; however, the embodiment depicted in FIG. 6 has a DRX cycle that is forty milliseconds in duration instead of eight milliseconds as in the example of FIG. 5. During each DRX cycle, the wireless device receiver 305 is activated during a period of time 502, 601 to receive control signals from the serving base station 203 and one or more of the neighboring cell base stations 204-206. The periods of time are periodic in this embodiment, but are longer than the durations of the subframes 502 of FIG. 5 because they take into account the ramp-up and ramp-down times for the wireless device 201. Comparing the waveform 600 of FIG. 6 to the typical prior art waveform 100 of FIG. 1, one skilled in the art can readily determine that separate intra-frequency, neighbor cell monitoring periods 107-112 of FIG.

1 are no longer present in FIG. 6, resulting in significant power savings for the wireless device battery 304.

Although FIG. 5 illustrates exemplary DTX-DRX uplink and downlink control channel time slot allocations, transmission of uplink control information need not be tied to a DTX phase. Rather, where the wireless device 201 includes a transmitter 307, the transmitter 307 may be instructed by the processor 301 at appropriate times to transmit control information to the serving base station 203 during a transmission period. The control information may be any conventional control information, including synchronization information as illustrated by the preamble/postamble slots 507 and the synch burst slots 509 depicted in FIG. 5. Where the wireless system 200 utilizes a CDMA or WCDMA air interface, the wireless device receiver 305 receives uplink/transmit power control information from the serving base station 203 during at least the uplink transmission period to facilitate transmit power control operation of the wireless device 201. If the wireless device receiver 305 is deactivated at the time at which the wireless device 201 is to begin receiving transmit power control information (e.g., because the wireless device 201 is implementing a DRX phase of a CPC mode), the wireless device processor 301 activates the receiver 305 (i.e., turns the receiver 305 on) to facilitate the reception of the transmit power control information. In the HSPA embodiment depicted in FIG. 5, the wireless device receiver 305 receives transmit power control information in downlink time slots 505 of the downlink control channel (F-DPCH) that overlap the uplink time slots 507, 509 of the uplink control channel (UL-DPCCH) in which control information is sent to the serving base station 203. Where the uplink and downlink control channel time slots are not aligned (as is shown in FIG. 5), the receipt of transmit power control information may begin and end respectively before and after transmission of the uplink control information so as to insure that appropriate transmit power control is maintained during the entire uplink transmission process.

Figure 8:
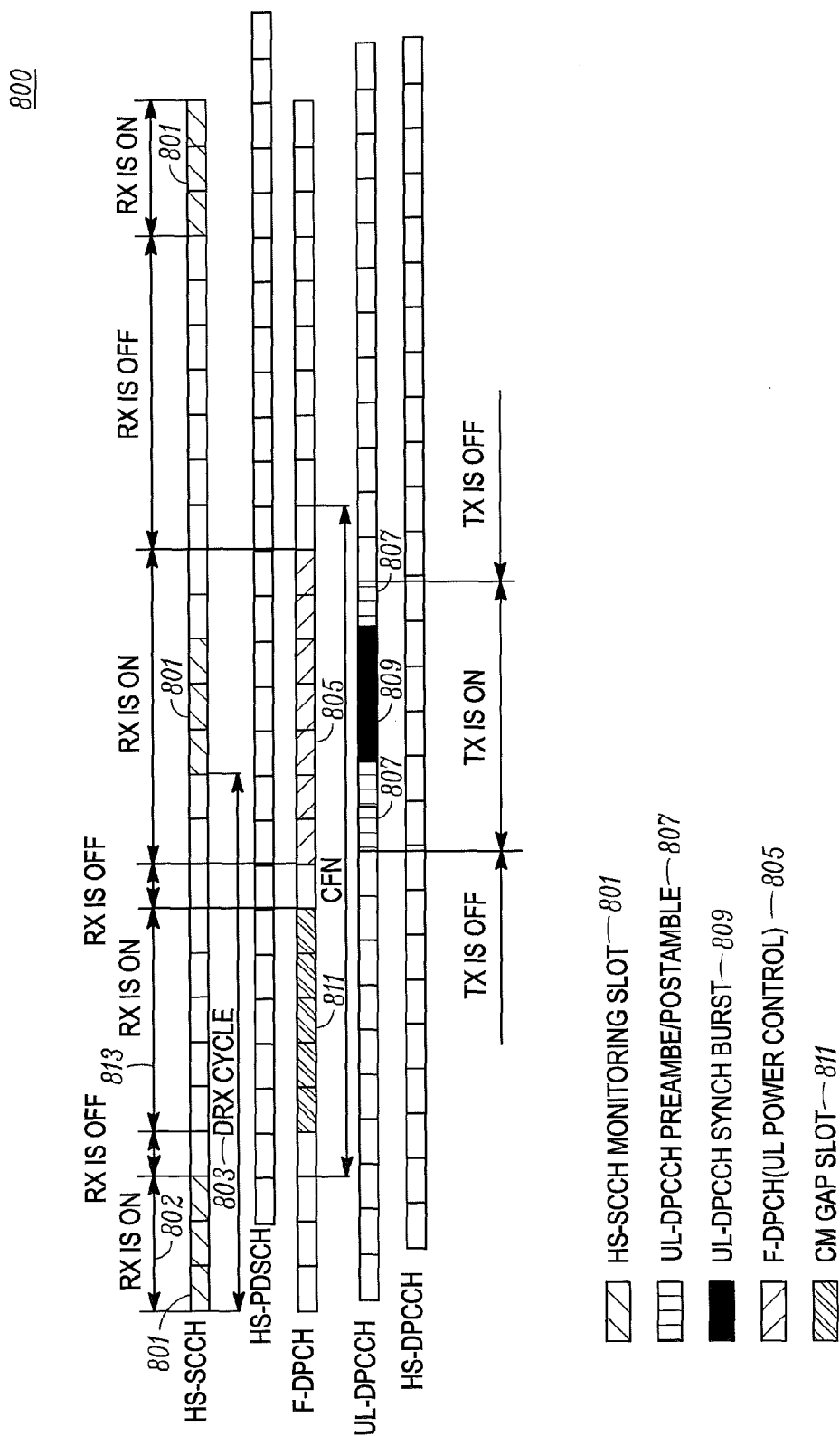
FIG. 8 is a timing diagram illustrating allocations of time slots and subframes of various uplink and downlink control channels during CPC and compressed mode operation of a wireless communication device, where a compressed mode gap does not overlap a time period for monitoring a serving cell's downlink control channel, in accordance with another exemplary embodiment of the present invention.
Figure 9:
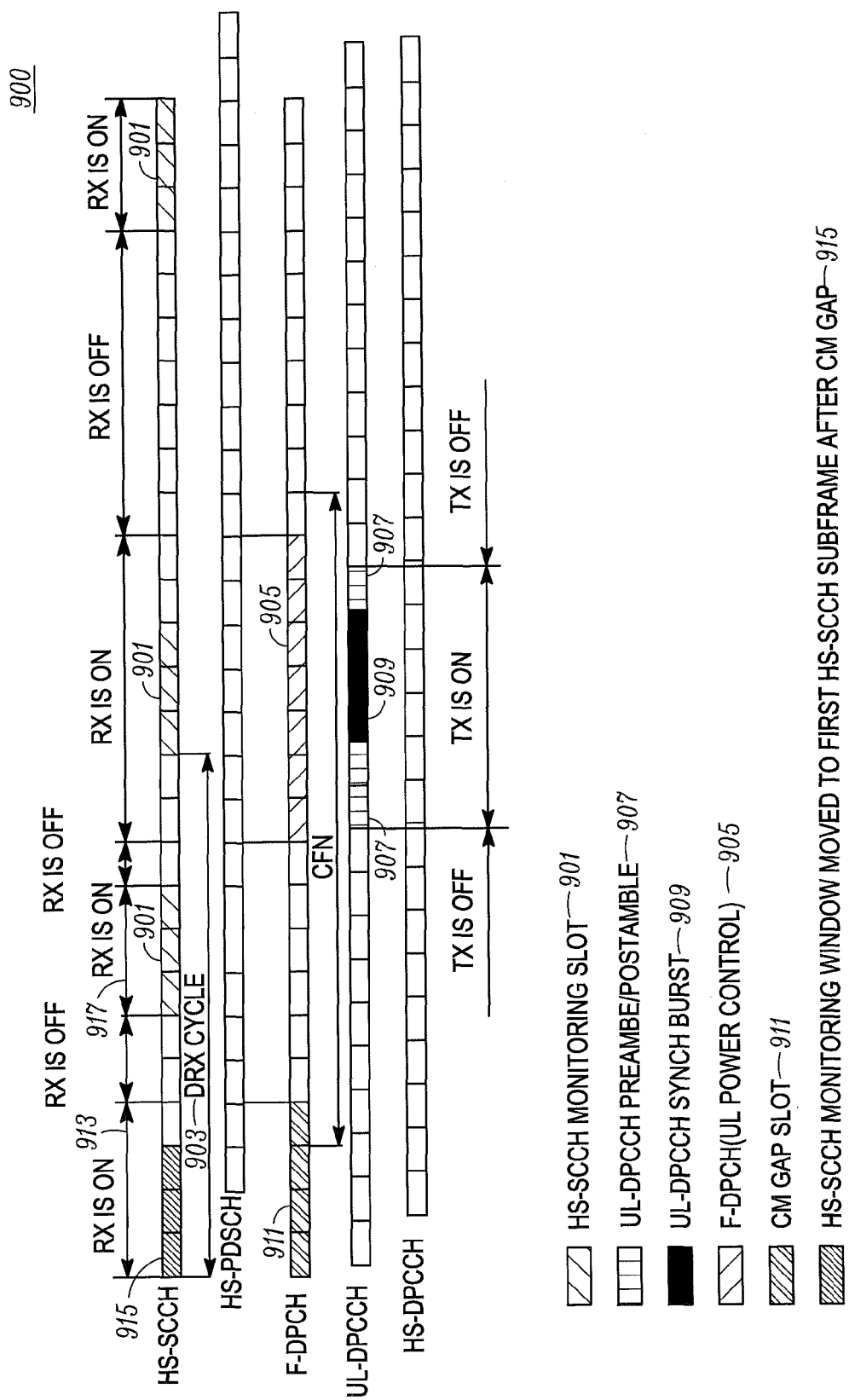
FIG. 9 is a timing diagram illustrating allocations of time slots and subframes of various uplink and downlink control channels during CPC and compressed mode operation of a wireless communication device, where a compressed mode gap overlaps a time period for monitoring a serving cell's downlink control channel, in accordance with a further exemplary embodiment of the present invention.
Figure 10:
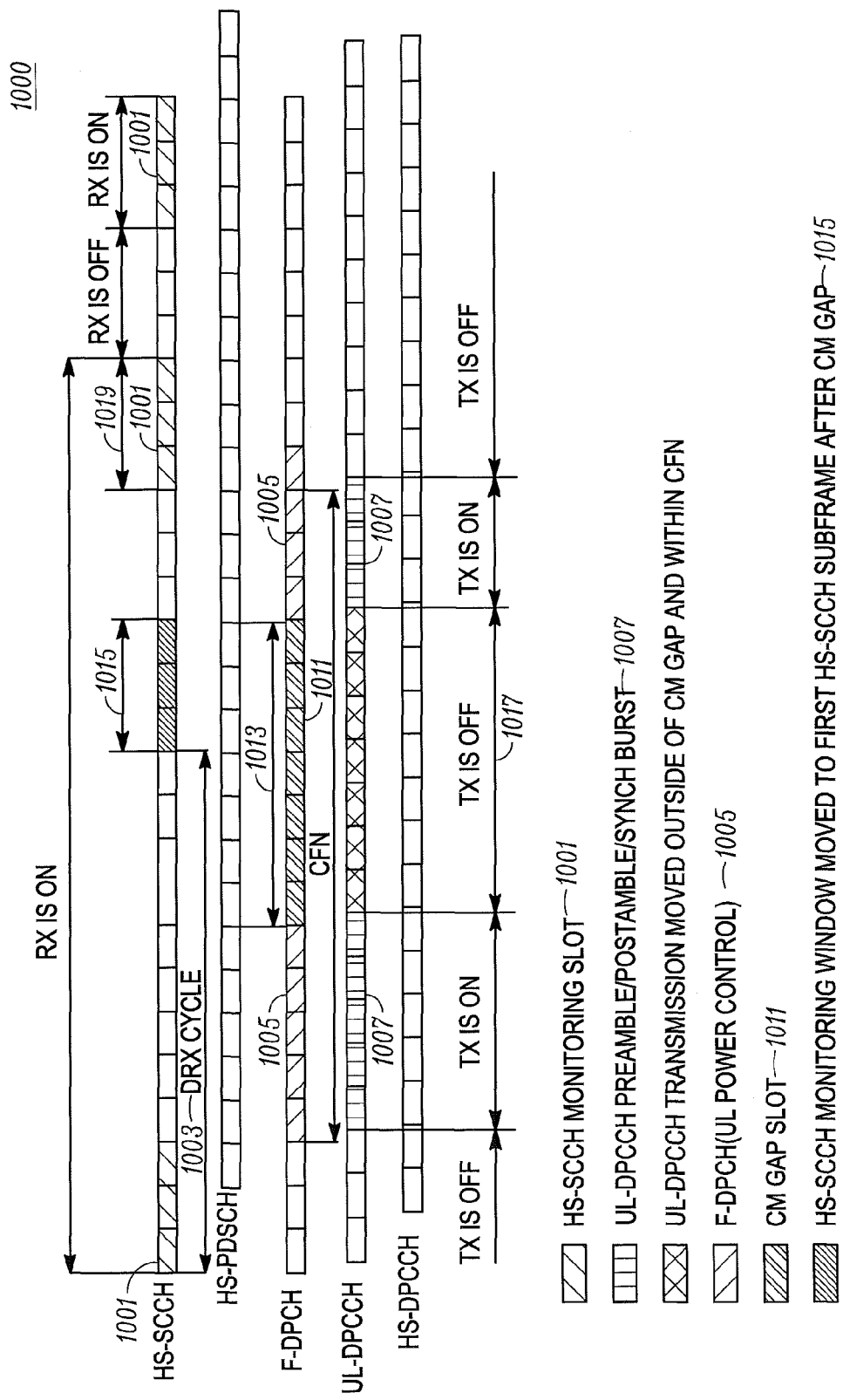
FIG. 10 is a timing diagram illustrating allocations of time slots and subframes of various uplink and downlink control channels during CPC and compressed mode operation of a wireless communication device, where a compressed mode gap overlaps both a time period for monitoring a serving cell's downlink control channel and a transmission time period for transmitting uplink control information to the serving cell, in accordance with yet another exemplary embodiment of the present invention.

As detailed above, FIGS. 5-6 relate to HSPA/WCDMA embodiments of the present invention in which CPC mode is not operating in combination with a dedicated mode, such as the compressed mode provided under 3GPP R7 TS 25.212, for measuring inter-frequency or other off-frequency neighbor cells. However, when CPC mode operates in combination with compressed mode, timing modifications must be made to accommodate the CM gaps present during compressed mode operation. An exemplary process for operating a wireless device 201 in a HSPA system using a WCDMA air interface when CPC mode operates together with compressed mode is depicted in the logic flow diagram 700 of FIGS. 7A-7B. Additionally, FIGS. 8-10 depict exemplary timing diagrams illustrating allocations of time slots and subframes of various uplink and downlink control channels during CPC and compressed mode operation of the wireless device 201 depending upon the positioning of the CM gaps during compressed mode. For example, FIG. 8 is a timing diagram 800 illustrating allocations of time slots and subframes of various uplink and downlink control channels during CPC and compressed mode operation of the wireless device 201, where a CM gap does not overlap a time period for monitoring the serving cell's downlink control channel. FIG. 9 is a timing diagram 900 illustrating allocations of time slots and subframes of various uplink and downlink control channels during CPC and compressed mode operation of the wireless device 201, where a CM gap overlaps a time period for monitoring the serving cell's downlink control channel. Lastly, FIG. 10 is a timing diagram 1000 illustrating allocations of time slots and subframes of various uplink and downlink control channels during CPC and compressed mode operation of the wireless device 201, where a CM gap overlaps both a time period for monitoring the serving cell's downlink control channel and a transmission time period for transmitting uplink control information to the serving base station 203. Operation of the wireless communication device 203 during CPC mode operating together with compressed mode will now be described with reference to FIGS. 7-10.

Figure 7A:
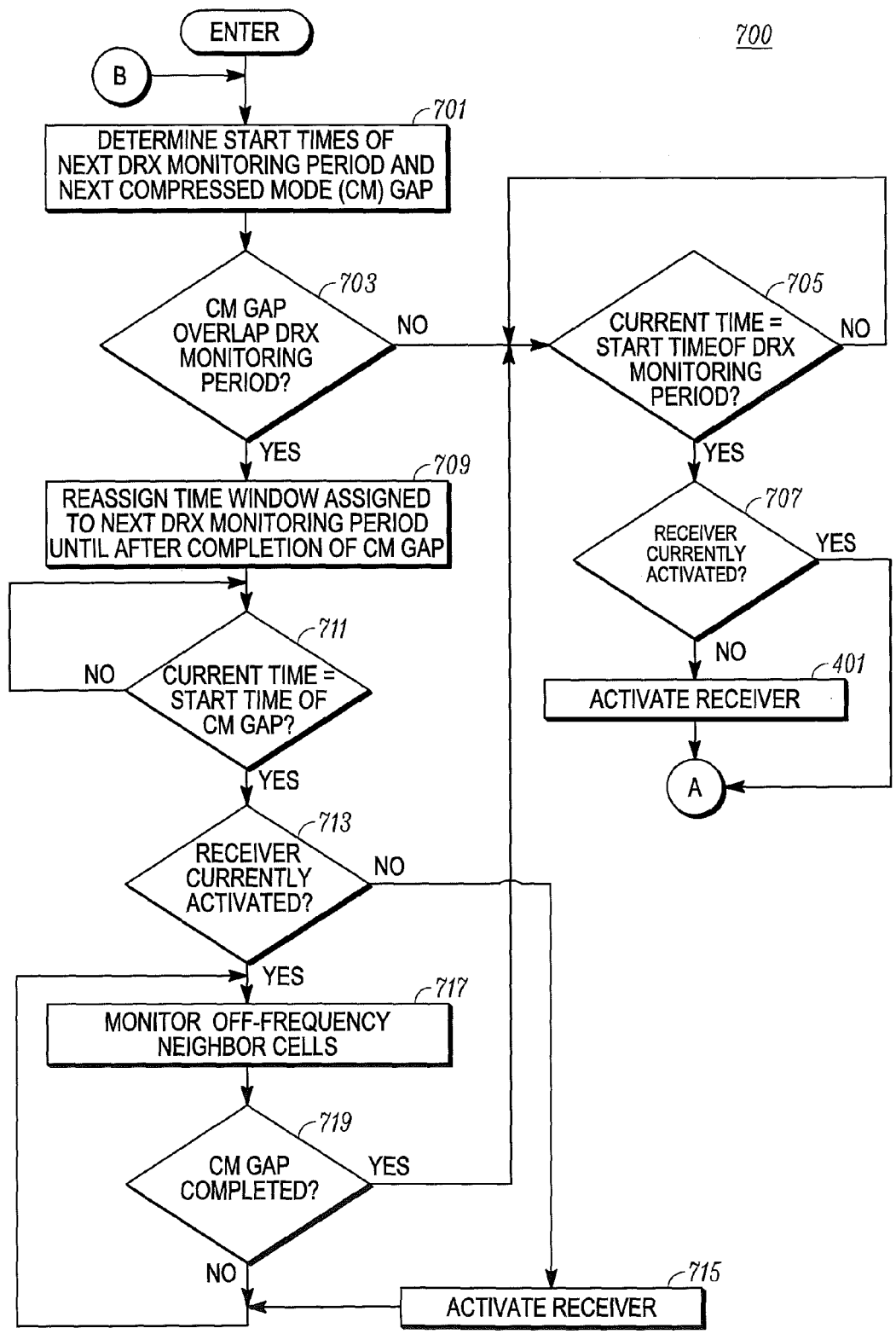
FIGS. 7A-7B are a logic flow diagram of steps executed by a wireless communication device to perform neighbor cell analysis while operating in CPC and compressed modes in accordance with another exemplary embodiment of the present invention.
Figure 7B:
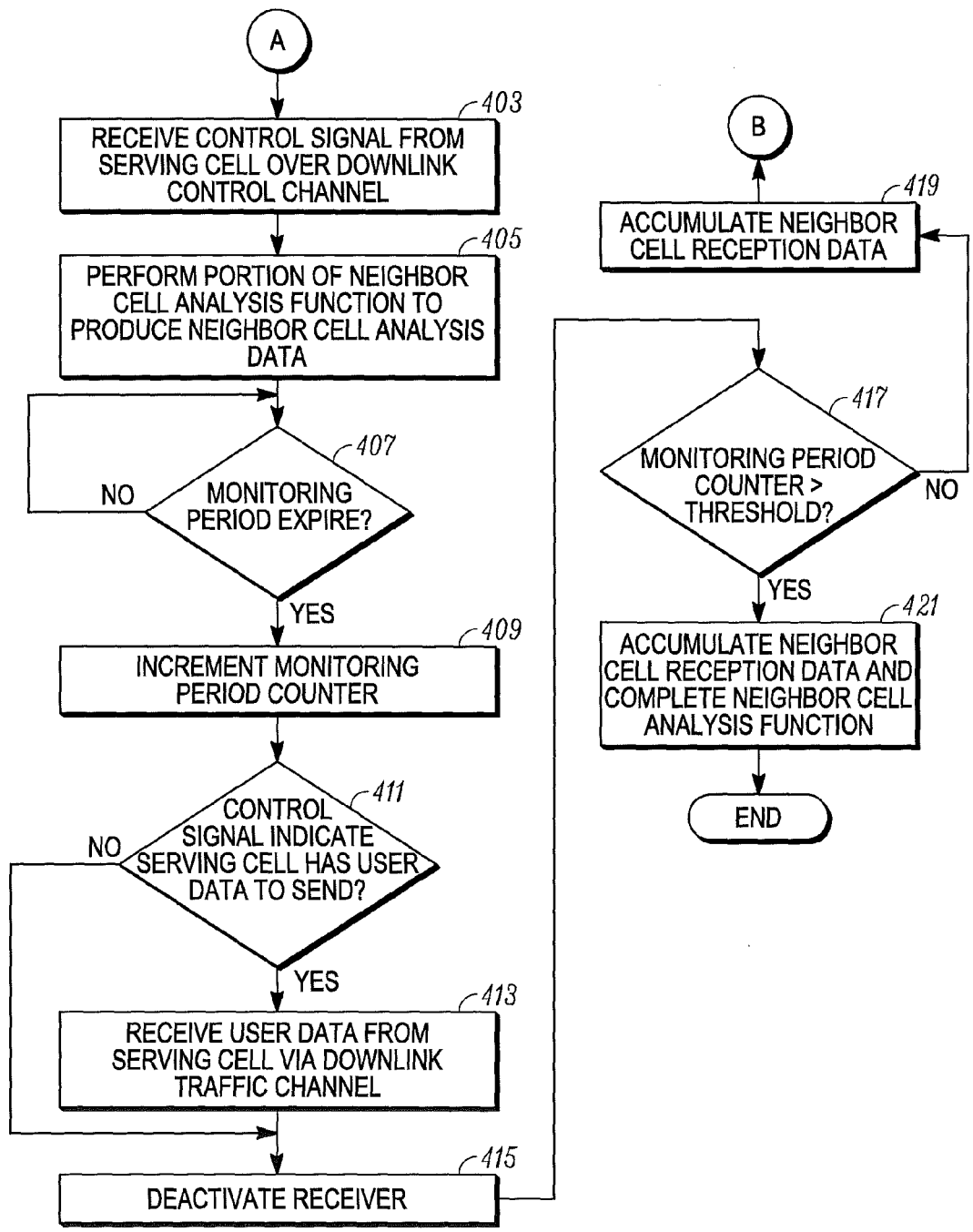

According to the logic flow 700 of FIGS. 7A and 7B, the wireless device processor 301 determines (701) the start time of the next DRX serving cell monitoring period and the start time of the next CM gap. As described in the Background section above, CM gaps are types of assigned cell monitoring periods used to facilitate analysis of neighbor cells other than intra-frequency neighbor cells (referred to herein as "off-frequency neighbor cells"), such as cells which do not operate in the same frequency band as the serving cell 207 or operate using a different wireless protocol (e.g., inter-frequency neighbor cells or cells utilizing the GSM protocol or another non-WCDMA protocol). After determining the start times for the next serving cell monitoring period and assigned off-frequency neighbor cell monitoring period (e.g., CM gap), the wireless device processor 301 determines (703) whether the next assigned off-frequency neighbor cell monitoring period overlaps the next serving cell monitoring period. If no overlap occurs, the wireless device processor 301 determines (705) whether the current time is equal to the start time of the next serving cell monitoring period. When the current time is equal to the next serving cell monitoring period, the wireless device processor 301 determines (707) whether the wireless device receiver 305 is currently activated (e.g., because it is receiving user data over a traffic channel, is receiving transmit power control information over a control channel, or is otherwise turned on). If the receiver 305 is not activated, the processor 301 activates (401) the receiver and the process flow continues as described above with respect to FIG. 4 in connection with receiving control signals from the serving base station 203 and performing the intra-frequency neighbor cell analysis function. If the receiver 305 is already activated, the process flow continues as described above with respect to FIG. 4 in connection with receiving control signals from the serving base station 203 and performing the intra-frequency neighbor cell analysis function.

Although not expressly shown in FIG. 7A, the wireless device processor 301 also determines whether the current time is equal to the start time of the next assigned off-frequency neighbor cell monitoring period. If the current time is equal to the start time of the next assigned off-frequency neighbor cell monitoring period, the wireless device processor 301 activates the receiver 305 (if not already activated) and the receiver 305 scans the frequencies of the off-frequency neighbor cells using the appropriate air interfaces and messaging protocols, and receives control signals from one or more off-frequency neighbor cell base stations over respective downlink control channels, during the off-frequency neighbor cell monitoring period. For purposes of the present description and the appended claims, the term "receiver" as well as the receiver 305 illustrated in FIG. 3 refer generally to functionality for receiving control and other signals from the serving base station 203, from base stations serving intra-frequency neighbor cells, and from base stations serving off-frequency neighbor cells. In other words, the receiver 305 of FIG. 3 represents receiving functionality generally and is not limited to operation with a single air interface. In such regard, the receiver 305 may include multiple individual receivers or a single, dynamically adaptive receiver controlled by the processor 301.

After the receiver 305 receives the off-frequency neighbor cell control signals, the wireless device processor 301 processes the off-frequency neighbor cell control signals to produce off-frequency neighbor cell control data and performs neighbor cell analysis functions based on the off-frequency neighbor cell control data. The neighbor cell analysis functions performed for particular off-frequency neighbor cells may vary depending on the wireless technologies used by the off-frequency neighbor cells. For example, the neighbor cell analysis functions performed may include decoding synchronization signals, determining scrambling codes, determining channel qualities for downlink control channels, and/or determining other channel or system parameters. Thus, the processor 301 uses the assigned off-frequency neighbor cell monitoring period (e.g., CM gap) to receive and analyze off-frequency neighbor cells during a time window independent of the time windows associated with performing serving cell monitoring and at least partially performing intra-frequency neighbor cell analysis.

Under the exemplary scenario provided in blocks 701, 703, 705, 707, and 401-421 of FIGS. 7A-7B, operation of the wireless device 201 during a serving cell monitoring period and during an assigned off-frequency neighbor cell monitoring period are mutually exclusive because neither monitoring period interferes with or overlaps the other. To provide an example of such a scenario, reference is made to the timing diagram 800 of FIG. 8, which illustrates operation of CPC mode in combination with compressed mode for an HSPA system.

As illustrated in FIG. 8, the serving cell monitoring periods are subframes 802 of three downlink time slots 801 over the HS-SCCH control channel. The DRX cycle 803 for this example is similar to the DRX cycle illustrated in FIG. 5 and includes twelve downlink time slots over the HS-SCCH. In one embodiment, each serving cell monitoring period (subframe 802) is two milliseconds in duration and each DRX cycle 803 is eight milliseconds in duration. The wireless device receiver 305 is activated during each serving cell monitoring period. The wireless device receiver 305 is also activated during the assigned off-frequency neighbor cell monitoring period 813, which in this embodiment is implemented as a CM gap occurring during a time window corresponding to five downlink time slots 811. As illustrated, the CM gap in this example does not overlap with either the serving cell monitoring period (e.g., subframe 802) or the time window assigned for transmitting power control information over the uplink control channel (e.g., the uplink DTX transmission period over the UL-DPCCH)), which control information may include an uplink synch burst in three uplink time slots 809 surrounded by two preamble and one postamble time slots 807. In accordance with the requirements of 3GPP R7 TS 25.212, the time window assigned to the CM gap (or an equivalent off-frequency neighbor cell monitoring period) and the time window assigned for transmitting power control information over the uplink control channel form part of a connection frame, which has a respective connection frame number (CFN). Because transmission by the wireless device 201 is prohibited during the CM gap according to 3GPP R7 TS 25.212, no uplink control channel transmission occurs during the CM gap and, accordingly, no transmit power control information is received by the wireless device 201 over the applicable serving cell downlink control channel (e.g., F-DPCH) during the CM gap. However, the wireless device receiver is activated during the CM gap to analyze off-frequency neighbor cells.

Referring back to FIG. 7, if the wireless device processor 301 determines (703) that the time window assigned to the next off-frequency neighbor cell monitoring period (e.g., CM gap) overlaps the time window assigned to the next serving cell monitoring period (DRX monitoring period), the wireless device processor 301 reassigns (709) the time window assigned to the next serving cell monitoring period such that the time window assigned to the next serving cell monitoring period does not overlap the time window assigned to the next serving cell monitoring period. For example, as indicated in block 709, the wireless device processor 301 may delay the time window assigned to the next serving cell monitoring period until after completion of the next off-frequency neighbor cell monitoring period. After reassigning the time window assigned to the next serving cell monitoring period, the wireless device processor 301 determines (711) whether the current time is equal to the start time of the off-frequency neighbor cell monitoring period. When the current time is equal to the start time of the off-frequency neighbor cell monitoring period, the wireless device processor 301 determines (713) whether the receiver 305 is currently activated. If the receiver 305 is not currently activated, the processor 301 activates (715) the receiver 305.

After the receiver 305 is activated or if it is already activated, the processor 301 monitors (717) and/or analyzes one or more off-frequency neighbor cells during the off-frequency neighbor cell monitoring period (e.g., CM gap) by processing received control signals from off-frequency neighbor cell base stations. After commencing the off-frequency neighbor cell monitoring period, the processor 301 determines (719) whether the off-frequency neighbor cell monitoring period has been completed. So long as the time window for the off-frequency neighbor cell monitoring period has not expired, the processor 301 continues to monitor/analyze (717) off-frequency neighbor cells. Because, in this embodiment, the serving cell monitoring period was reassigned to begin after completion of the off-frequency neighbor cell monitoring period, the wireless device processor 301 determines (705) whether the current time is equal to the starting time of the serving cell monitoring period after completion of the off-frequency neighbor cell monitoring period. When the processor 301 determines that the current time is equal to the starting time of the serving cell monitoring period, the logic flow proceeds through blocks 707 and 401-421 as described above to perform serving cell monitoring and intra-frequency neighbor cell analysis.

An example of shifting or reassigning of a time window assigned to a serving cell monitoring period so that the serving cell monitoring period does not overlap a time window assigned to an off-frequency neighbor cell monitoring period (e.g., CM gap) is provided in the timing diagram 900 of FIG. 9, which illustrates operation of CPC mode in combination with compressed mode for an HSPA system. In this example, the intended serving cell monitoring period represented by time slots 915 and occurring during time window 913 overlaps with the time window assigned to the time slots 911 of the CM gap. As a result, the wireless device processor 301 reassigns the time window of the serving cell monitoring period so as not to overlap the time window assigned to the CM gap. In the embodiment of FIG. 9, the processor 301 assigns the serving cell monitoring period to the first downlink control channel (e.g., HS-SCCH) subframe 917 which commences after cessation of the CM gap. Thus, when a serving cell monitoring period is reassigned to accommodate an off-frequency neighbor cell monitoring period (e.g., CM gap), the serving cell monitoring periods of the DRX phase may no longer be periodic, but are still discontinuous in time. Such a condition is illustrated in FIG. 9 as shown by the HS-SCCH time slots 901 used for the serving cell monitoring periods.

In the example illustrated in FIG. 9, the off-frequency neighbor cell monitoring period (e.g., CM gap) does not overlap or otherwise affect the DTX transmission period or the associated reception of transmit power control information over a downlink control channel, such as the F-DPCH. Therefore, the downlink control channel time slots 905 over which the transmit power control information is received by the wireless device 201 and the uplink control channel time slots 907, 909 over which the uplink control information (e.g., synch burst and associated preamble and postamble) is transmitted by the wireless device 201 remain unaffected by the CM gap as scheduled in the embodiment of FIG. 9. However, because the wireless device receiver 305 is turned on during the CM gap or other off-frequency neighbor cell monitoring period to receive control signals from base stations servicing the off-frequency neighbor cells, the receiver 305 remains on for a longer period of time during compressed mode operation.

Another example of shifting or reassigning of a time window assigned to a serving cell monitoring period so that the serving cell monitoring period does not overlap a time window assigned to an off-frequency neighbor cell monitoring period (e.g., CM gap) is provided in the timing diagram 1000 of FIG. 10, which also illustrates operation of CPC mode in combination with compressed mode for an HSPA system. In contrast to the embodiment of FIG. 9, the embodiment of FIG. 10 illustrates in an exemplary manner how a time window for an off-frequency neighbor cell monitoring period may affect a time window assigned to transmit control information to a serving base station 203 over an uplink control channel (e.g., UL-DPCCH) in addition to affecting a time window assigned to a serving cell monitoring period. Additionally, because all transmissions by a wireless device 201 in a WCDMA system generally require transmit power control, reassignment of a transmission time window, whether for control information or for user information, affects the time window assigned for receiving transmit power control information from by the serving base station 203.

In the embodiment illustrated in FIG. 10, the time window 1013 for the off-frequency neighbor cell monitoring period (e.g., CM gap) overlaps a time window 1015 scheduled for a serving cell monitoring period and a time window 1017 scheduled for transmission of uplink control information. Therefore, according to the present invention, the time window for the serving cell monitoring period is reassigned so as not to overlap with the time window 1013 for the off-frequency neighbor cell monitoring period. For example, similar to the embodiment of FIG. 9, the time window 1019 for the affected serving cell monitoring period may be assigned to a time window commencing after cessation of the off-frequency neighbor cell monitoring period (e.g., to the first subframe after the CM gap). With such a change, the downlink time slots 1001 used for receiving serving cell control information and at least partially performing the intra-frequency neighbor cell analysis function remain discontinuous, but are not periodic.

Regarding the overlap of the off-frequency neighbor cell monitoring period and the time window 1017 scheduled for transmission of uplink control information, the 3GPP specification requires the wireless device 201 to transmit uplink synch control information in all slots of a connection frame which do not overlap with the CM gap. To comply with this requirement, the embodiment of FIG. 10 illustrates that the uplink control information is transmitted in uplink slots 1007 which are outside of the CM gap slots 1011 and which fill the connection frame (CFN) that includes the time window 1013 assigned to the off-frequency neighbor cell monitoring period and the time window assigned to transmit control information over the uplink control channel (e.g., UL-DPCCH). To facilitate the reassigned uplink control transmissions, the wireless device processor 301 activates the wireless device receiver 305 or keeps it activated (as is the case in the embodiment of FIG. 10) to receive transmit power control information in time slots 1005 over a downlink control channel (e.g., F-DPCH), which slots 1005 are arranged into two discontinuous periods surrounding the CM gap 1013 and overlapping the discontinuous periods during which uplink control information is transmitted over the uplink control channel.

To accomplish reassignment of the uplink control information transmission in accordance with the embodiment of FIG. 10, the wireless device processor 301 initially instructs the transmitter 307 to transmit control information over the uplink control channel (UL-DPCCH) to the serving base station 203 during the connection frame and prior to commencement of the time window 1013 assigned to the off-frequency neighbor cell monitoring period (CM gap). The wireless device processor 301 then instructs the wireless device transmitter 307 to temporarily cease transmission of control information over the uplink control channel during at least part of the time window 1013 assigned to the off-frequency neighbor cell monitoring period. For example, as illustrated in FIG. 10, because uplink and downlink slots are generally offset in time, transmission of control information over the uplink control channel may slightly overlap the beginning or end of the off-frequency neighbor cell monitoring period (e.g., overlap at the beginning of the off-frequency neighbor cell monitoring period is illustrated in FIG. 10). After the off-frequency neighbor cell monitoring period has ceased or expired, the wireless device processor 301 instructs the transmitter 307 to continue transmission of the control information over the uplink control channel for a remainder of the connection frame.

Additionally, consistent with the reassigned uplink control information transmissions, the wireless device processor 301 instructs the receiver 305 to cease reception of transmit power control information from the serving base station 203 during the time window assigned to the off-frequency neighbor cell monitoring period. The wireless device processor 301 then further instructs the receiver 305 to receive transmit power control information from the serving base station 203 during the time periods when control information is being transmitted over the uplink control channel (e.g., during the time periods embodied by downlink time slots 1005). Because the wireless device receiver 305 is turned or remains on during the off-frequency neighbor cell monitoring period to receive control signals from base stations servicing the off-frequency neighbor cells and further because positioning of the off-frequency neighbor cell monitoring period results in extended receipt of transmit power control information, the receiver 305 remains on for a longer period of time in the embodiment of FIG. 10 as compared to the embodiment of FIG. 9.

The present invention encompasses a wireless communication device and associated method for performing neighbor cell analysis functions while operating in CPC mode and without requiring dedicated time periods for performing the neighbor cell analysis functions as part of a DRX phase of the CPC mode. With this invention, neighbor cell analysis can be performed in a distributed manner over time using the time periods allotted for serving cell monitoring, thereby eliminating the need for dedicated time periods within the DRX phase of CPC mode to monitor and analyze intra-frequency neighbor cells. The elimination of separate, dedicated time periods for performing intra-frequency neighbor cell analysis reduces the amount of time the wireless device receiver is on during CPC mode and improves battery life. The present invention may also be adapted to accommodate compressed mode operation as provided under 3GPP R7 TS 25.212, while still reducing battery current drain as compared to prior art devices that support CPC and compress modes.

As detailed above, embodiments of the present invention reside primarily in combinations of method steps and/or apparatus components related to performing neighbor cell analysis functions while operating in CPC mode and without requiring dedicated time periods for performing the neighbor cell analysis functions as part of a DRX phase of the CPC mode. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual such relationship or order between such entities or actions. The terms "comprises," "comprising," "includes," "including," "has," "having," "contains," "containing," and any other variations thereof are intended to cover a non-exclusive inclusion, such that a process, method, article, or apparatus that comprises, includes, has, or contains a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the wireless communication device 201 described herein may be comprised of one or more conventional processors and unique stored program instructions that control the processor(s) to implement, in conjunction with certain non-processor circuits, some, most, or all of the functions of the wireless communication device 201 and its operational methods as described herein. The non-processor circuits may include, but are not limited to, storage devices, such as the internal memory 303, the battery 304, the receiver 305, and the transmitter 307 described above, as well as filters, clock circuits, and various other non-processor circuits. As such, the functions of these non-processor circuits may be interpreted as steps of a method to perform neighbor cell analysis functions while operating in CPC mode and without requiring dedicated time periods for performing the neighbor cell analysis functions as part of a DRX phase of the CPC mode. Alternatively, some or all functions could be implemented by a state machine that has no stored program instructions, or in one or more application specific integrated circuits (ASICs), in which each function or some combinations of certain of the functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for a wireless communication device to perform neighbor cell analysis, the method comprising:
    monitoring, by a receiver as part of a discontinuous reception (DRX) phase of a continuous packet connectivity mode (CPC), a downlink control channel from a serving base station in a plurality of time periods that are discontinuous;
    receiving, by the receiver, a control signal over the downlink control channel during each time period of the plurality of time periods;
    performing a portion of a neighbor cell analysis during each time period of a predetermined quantity of the plurality of time periods to produce neighbor cell analysis data, wherein the predetermined quantity of the plurality of time periods comprises two or more time periods, wherein the neighbor cell analysis data produced during any one time period of the predetermined quantity of the plurality of time periods is insufficient to complete the neighbor cell analysis, and wherein a completed neighbor cell analysis includes decoding a primary or secondary synchronization signal for one or more neighbor base stations, determining a scrambling code for one or more of the neighbor base stations, or measuring or determining channel quality for downlink control channels of one or more of the neighbor base stations; and
    accumulating the neighbor cell analysis data over the predetermined quantity of the plurality of time periods; and
    completing the neighbor cell analysis based on said accumulating of the neighbor cell analysis data over the predetermined quantity of the plurality of time periods.

2. The method of claim 1, wherein each time period of the plurality of time periods has a duration of at least two milliseconds as established by control messaging received from the serving base station.

3. The method of claim 1, wherein the downlink control channel is divided into a plurality of time slots and wherein each time period of the plurality of time periods occupies three time slots.

4. The method of claim 1, wherein the plurality of time periods are periodic.

5. The method of claim 1, wherein the downlink control channel is a first downlink control channel and the method further comprises:

transmitting, by a transmitter of the wireless communication device, control information to the serving base station during a transmission period over an uplink control channel; and receiving, by the receiver over a second downlink control channel, transmit power control information from the serving base station during at least the transmission period to facilitate transmit power control operations of the wireless communication device.

6. The method of claim 5, wherein the first downlink control channel is a High Speed Shared Control Channel (HS-SCCH), wherein the second downlink control channel is a Fractional Dedicated Physical Channel (F-DPCH), and wherein the uplink control channel is an Uplink Dedicated Physical Control Channel (UL-DPCCH).

7. The method of claim 5, wherein the transmission period forms part of a discontinuous transmission (DTX) phase of the CPC mode.

8. The method of claim 5, wherein the second downlink control channel is divided into a plurality of downlink time slots, wherein the uplink control channel is divided into a plurality of uplink time slots, wherein the transmission period occupies a set of uplink time slots, and wherein receiving transmit power control information from the serving base station during at least the transmission period comprises:
receiving transmit power control information from the serving base station during a set of downlink time slots, wherein the set of downlink time slots overlaps the set of uplink time slots in time.

9. The method of claim 8, wherein the set of uplink time slots includes a synchronization burst together with a preamble and a postamble.

10. The method of claim 1, wherein the portion of the neighbor cell analysis function performed during each time period of the predetermined quantity of time periods pertains to analysis of intra-frequency neighbor cells, and the method further comprises:
performing analysis of neighbor cells other than intra-frequency neighbor cells during assigned cell monitoring periods by:
receiving, by the receiver, control signals from base stations servicing neighbor cells other than intra-frequency neighbor cells over respective downlink control channels during the assigned cell monitoring periods to produce received off-frequency neighbor cell control signals;
processing the off-frequency neighbor cell control signals to produce off-frequency neighbor cell control data; and
performing neighbor cell analysis based on the off-frequency neighbor cell control data.

11. The method of claim 10, wherein a time window assigned to a cell monitoring period of the assigned cell monitoring periods overlaps a time window assigned to a time period of the plurality of time periods, the method further comprising:
reassigning the time window assigned to the time period of the plurality of time periods such that the time window assigned to the cell monitoring period does not overlap the time window assigned to the time period of the plurality of time periods.

12. The method of claim 11, wherein the downlink control channel is divided into a plurality of subframes and wherein reassigning the time window assigned to the time period of the plurality of time periods comprises:
assigning the time period of the plurality of time periods to a subframe of the downlink control channel which commences after cessation of the cell monitoring period.

13. The method of claim 10, wherein a time window assigned to a cell monitoring period of the assigned cell monitoring periods overlaps a time window assigned to transmit control information over the uplink control channel, and wherein the time window assigned to the cell monitoring period and the time window assigned to transmit control information over the uplink control channel form part of a connection frame, the method further comprising:
transmitting, with a transmitter of the wireless communication device, control information over an uplink control channel during the connection frame and prior to commencement of the time window assigned to the cell monitoring period;
temporarily ceasing transmission of control information over the uplink control channel during at least part of the time window assigned to the cell monitoring period;
continuing transmission of the control information over the uplink control channel after cessation of the cell monitoring period and for a remainder of the connection frame;
ceasing reception of transmit power control information from the serving base station during the time window assigned to the cell monitoring period; and
receiving transmit power control information from the serving base station during time periods when control information is being transmitted over the uplink control channel.

14. The method of claim 13, wherein the time window assigned to the cell monitoring period also overlaps a time window assigned to a time period of the plurality of time periods, the method further comprising:
reassigning the time window assigned to the time period of the plurality of time periods such that the time window assigned to the cell monitoring period does not overlap the time window assigned to the time period of the plurality of time periods.

15. The method of claim 1, wherein performing a portion of a neighbor cell analysis includes at least partially measuring channel quality of a downlink control channel operated by a base station servicing a cell neighboring a cell serviced by the serving base station.

16. The method of claim 1, wherein performing a portion of a neighbor cell analysis includes at least partially decoding a primary synchronization signal communicated by a base station servicing a cell neighboring a cell serviced by the serving base station.

17. The method of claim 16, wherein performing a portion of a neighbor cell analysis further includes at least partially decoding a secondary synchronization signal communicated by the base station of the neighboring cell.

18. The method of claim 17, wherein performing a portion of a neighbor cell analysis further includes determining a scrambling code for the neighboring cell.

19. The method of claim 1, further comprising:
prior to receiving a control signal over the downlink control channel, activating the receiver of the wireless communication device upon commencement of a time period of the plurality of periodic time periods, the receiver having been previously deactivated; and
deactivating the receiver of the wireless communication device upon expiration of the time period in the event that the control signal received during the time period does not indicate that the serving base station has user data to send to the wireless communication device.

20. A method comprising:
activating a receiver of the wireless communication device upon commencement of each time period of a plurality of periodic time periods of a discontinuous reception (DRX) phase of a continuous packet connectivity (CPC) mode, the receiver having been previously deactivated;
receiving, by the receiver, a control signal over the downlink control channel during each time period of the plurality of periodic time periods;
performing a portion of a neighbor cell analysis during each time period of a predetermined quantity of the plurality of periodic time periods to produce neighbor cell analysis data, wherein the predetermined quantity of the plurality of time periods comprises two or more time periods, wherein the neighbor cell analysis data produced during any one time period of the predetermined quantity of the plurality of time periods is insufficient to complete the neighbor cell analysis, and wherein a completed neighbor cell analysis includes decoding a primary or secondary synchronization signal for one or more neighbor base stations, determining a scrambling code for one or more of the neighbor base stations, or measuring or determining channel quality for downlink control channels of one or more of the neighbor base stations;
deactivating the receiver of the wireless communication device upon expiration of a time period of the plurality of periodic time periods in the event that the control signal received during the time period does not indicate that the serving base station has user data to send to the wireless communication device; and
accumulating the neighbor cell analysis data over the predetermined quantity of the plurality of periodic time periods to complete the neighbor cell analysis.

21. A wireless communication device operable to perform neighbor cell analysis as part of a discontinuous reception (DRX) phase of a continuous packet connectivity (CPC) mode, the wireless communication device comprising:
a receiver operable, when activated, to receive a control signal over the downlink control channel during each time period of the plurality of time periods that are discontinuous and are to be used to monitor a downlink control channel from a serving base station as part of the DRX phase; and
a processor operably coupled to the receiver and operable in accordance with a set of operating instructions to:
perform a portion of a neighbor cell analysis during each time period of a predetermined quantity of the plurality of time periods to produce neighbor cell analysis data, wherein the predetermined quantity of the plurality of time periods comprises two or more time periods, and wherein the neighbor cell analysis data produced during any one time period of the predetermined quantity of the plurality of time periods is insufficient to complete the neighbor cell analysis; and
accumulate the neighbor cell analysis data over the predetermined quantity of the plurality of time periods to complete the neighbor cell analysis.

22. The wireless communication device of claim 21, further comprising:
a transmitter operably coupled to the processor and operable, when activated, to transmit control information to the serving base station during a transmission period;
wherein the receiver is further operable to receive transmit power control information from the serving base station during at least the transmission period to facilitate transmit power control operations of the wireless communication device.

23. The wireless communication device of claim 22, wherein the downlink control channel is a first downlink control channel and a second downlink control channel is divided into a plurality of downlink time slots, the uplink control channel is divided into a plurality of uplink time slots, the transmission period occupies a set of uplink time slots, and the receiver is operable to receive transmit power control information from the serving base station during at least the transmission period by receiving transmit power control information from the serving base station during a set of downlink time slots, wherein the set of downlink time slots overlaps the set of uplink time slots in time.

24. The wireless communication device of claim 21, wherein the processor is further operable to:
activate the receiver upon commencement of a time period of the plurality of periodic time periods, the receiver having been previously deactivated; and
deactivate the receiver upon expiration of the time period in the event that the control signal received during the time period does not indicate that the serving base station has user data to send to the wireless communication device.

25. The wireless communication device of claim 21, wherein the portion of the neighbor cell analysis performed during each time period of the quantity of time periods pertains to analysis of intra-frequency neighbor cells, wherein the receiver is further operable to receive control signals from base stations servicing neighbor cells other than intra-frequency neighbor cells over respective downlink control channels during assigned cell monitoring periods to produce received off-frequency neighbor cell control signals, and wherein the processor is further operable to:
process the off-frequency neighbor cell control signals to produce off-frequency neighbor cell control data; and
perform neighbor cell analysis based on the off-frequency neighbor cell control data.

26. The wireless communication device of claim 25, wherein a time window assigned to a cell monitoring period of the assigned cell monitoring periods overlaps a time window assigned to a time period of the plurality of time periods, and wherein the processor is further operable to:
reassign the time window assigned to the time period of the plurality of time periods such that the time window assigned to the cell monitoring period does not overlap the time window assigned to the time period of the plurality of time periods.

27. The wireless communication device of claim 26, wherein the downlink control channel is divided into a plurality of subframes and wherein the processor is operable to reassign the time window assigned to the time period of the plurality of time periods by assigning the time period of the plurality of time periods to a subframe of the downlink control channel which commences after cessation of the cell monitoring period.

28. The wireless communication device of claim 21, wherein the downlink control channel is a first downlink control channel and the wireless communication device further comprises:
a transmitter operably coupled to the processor and operable to transmit control information to the serving base station over an uplink control channel;
wherein the receiver is further operable to receive transmit power control information from the serving base station over a second downlink control channel, wherein a time window assigned to a cell monitoring period of the assigned cell monitoring periods overlaps a time window assigned to transmit control information over the uplink control channel, wherein the time window assigned to the cell monitoring period and the time window assigned to transmit control information over the uplink control channel form part of a connection frame, and wherein the processor is further operable to:

instruct the transmitter to transmit control information over the uplink control channel during the connection frame and prior to commencement of the time window assigned to the cell monitoring period;

instruct the transmitter to temporarily cease transmission of control information over the uplink control channel during at least part of the time window assigned to the cell monitoring period;

instruct the transmitter to continue transmission of the control information over the uplink control channel after cessation of the cell monitoring period and for a remainder of the connection frame; and instruct the receiver to receive transmit power control information from the serving base station during time periods when control information is being transmitted over the uplink control channel.

29. The wireless communication device of claim 28, wherein the time window assigned to the cell monitoring period also overlaps a time window assigned to a time period of the plurality of time periods, and wherein the processor is further operable to:

reassign the time window assigned to the time period of the plurality of time periods such that the time window assigned to the cell monitoring period does not overlap the time window assigned to the time period of the plurality of time periods.

30. The wireless communication device of claim 21, wherein the processor is operable to perform a portion of a neighbor cell analysis by at least partially measuring channel quality of a downlink control channel operated by a base station servicing a cell neighboring a cell serviced by the serving base station.

31. The wireless communication device of claim 21, wherein a completed neighbor cell analysis comprises decoding a primary synchronization signal communicated by a base station servicing a cell neighboring a cell serviced by the serving base station.

32. The wireless communication device of claim 31, wherein a completed neighbor cell analysis comprises decoding a secondary synchronization signal communicated by the base station servicing the neighboring cell.

33. The wireless communication device of claim 32, wherein a completed neighbor cell analysis comprises determining a scrambling code for the neighboring cell.

* * * * *